United States Patent
Gupta et al.

(10) Patent No.: US 10,813,054 B2
(45) Date of Patent: Oct. 20, 2020

(54) FEEDBACK TRANSMISSION TECHNIQUES IN COORDINATED CLUSTERS OF TRANSMISSION RECEPTION POINTS

(71) Applicant: QUALCOMM Incorporated, San Diego, CA (US)

(72) Inventors: Piyush Gupta, Bridgewater, NJ (US); Junyi Li, Chester, NJ (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/277,948

(22) Filed: Feb. 15, 2019

(65) Prior Publication Data
US 2019/0261278 A1 Aug. 22, 2019

Related U.S. Application Data

(60) Provisional application No. 62/633,494, filed on Feb. 21, 2018.

(51) Int. Cl.
*H04W 52/14* (2009.01)
*H04L 1/16* (2006.01)
(Continued)

(52) U.S. Cl.
CPC ......... *H04W 52/146* (2013.01); *H04L 1/1657* (2013.01); *H04L 1/1854* (2013.01);
(Continued)

(58) Field of Classification Search
CPC .. H04L 1/1657; H04W 52/146; H04W 52/48; H04W 72/0473; H04W 72/1263; H04W 72/1278
(Continued)

(56) References Cited

U.S. PATENT DOCUMENTS

| 2008/0077837 A1* | 3/2008 | Lohr | H04L 1/1819 |
| | | | 714/748 |
| 2012/0195292 A1* | 8/2012 | Ko | H04L 1/1893 |
| | | | 370/336 |

(Continued)

FOREIGN PATENT DOCUMENTS

WO  WO-2017192070 A1  11/2017

OTHER PUBLICATIONS

International Search Report and Written Opinion—PCT/US2019/018427—ISA/EPO—dated Jun. 4, 2019.

*Primary Examiner* — Tan H Trinh

(57) ABSTRACT

Methods, systems, and devices for wireless communications are described. Techniques for multiple transmission reception points (TRPs) in a cluster may coordinate scheduling and communications with a user equipment (UE). Different TRPs may allocate uplink resources for one or more UEs within a coordinated cluster to transmit feedback information. A first TRP may provide a first set of resources that one or more associated UEs may use to transmit acknowledgment (ACK) feedback to indicate successful receipt of a downlink transmission of the first TRP, and one or more other TRPs of the coordinated cluster may provide a second set of resources that the one or more UEs may use to transmit negative acknowledgment (NACK) feedback to indicate that a downlink transmission of the first TRP was lost. The second set of resources may include non-orthogonal multiple access (NOMA) resources.

19 Claims, 20 Drawing Sheets

(51) Int. Cl.
*H04W 52/48* (2009.01)
*H04W 72/12* (2009.01)
*H04W 72/04* (2009.01)
*H04L 5/00* (2006.01)
*H04L 1/18* (2006.01)

(52) U.S. Cl.
CPC ........... *H04L 5/0055* (2013.01); *H04W 52/48* (2013.01); *H04W 72/0473* (2013.01); *H04W 72/1263* (2013.01); *H04W 72/1278* (2013.01)

(58) Field of Classification Search
USPC ........ 455/69, 522, 9; 370/329, 336; 714/748
See application file for complete search history.

(56) References Cited

U.S. PATENT DOCUMENTS

| | | |
|---|---|---|
| 2013/0114561 A1 | 5/2013 | Simonsson et al. |
| 2015/0071193 A1* | 3/2015 | Seo ....................... H04L 1/1692 370/329 |
| 2015/0085680 A1 | 3/2015 | Vrzic et al. |
| 2016/0285591 A1* | 9/2016 | Dortmund ............. H04L 1/1877 |
| 2018/0124725 A1* | 5/2018 | Ghanbarinejad ..... H04W 76/15 |
| 2018/0199212 A1* | 7/2018 | Lin ........................ H04B 7/005 |
| 2018/0287763 A1* | 10/2018 | Baghel .................. H04W 28/04 |
| 2018/0332541 A1* | 11/2018 | Liu ..................... H04W 72/042 |
| 2019/0020381 A1* | 1/2019 | Tooher .................. H04B 7/026 |
| 2019/0044666 A1* | 2/2019 | Li ......................... H04L 1/1812 |
| 2019/0132852 A1* | 5/2019 | Petersson ............ H04W 72/046 |
| 2019/0222360 A1* | 7/2019 | Nam ..................... H04L 1/1812 |
| 2019/0230691 A1* | 7/2019 | Cao ...................... H04L 5/0044 |
| 2019/0253127 A1* | 8/2019 | Kang .................... H04B 7/063 |
| 2019/0253200 A1* | 8/2019 | Salem ................ H04W 72/042 |
| 2019/0289563 A1* | 9/2019 | Ghanbarinejad . H04W 36/0085 |
| 2019/0312711 A1* | 10/2019 | Stern-Berkowitz .......................... H04L 5/0053 |
| 2019/0364557 A1* | 11/2019 | Harada ................. H04L 5/0055 |
| 2019/0387501 A1* | 12/2019 | Park ..................... H04L 5/0053 |
| 2020/0007282 A1* | 1/2020 | Yoon .................... H04W 72/085 |
| 2020/0008231 A1* | 1/2020 | Vilaipornsawai ...... H04B 7/024 |

* cited by examiner

FEEDBACK TRANSMISSION TECHNIQUES IN COORDINATED CLUSTERS OF TRANSMISSION RECEPTION POINTS

CROSS REFERENCES

The present Application for patent claims the benefit of U.S. Provisional Patent Application No. 62/633,494 by GUPTA, et al., entitled "FEEDBACK TRANSMISSION TECHNIQUES IN COORDINATED CLUSTERS OF TRANSMISSION RECEPTION POINTS," filed Feb. 21, 2018, assigned to the assignee hereof, and expressly incorporated herein.

BACKGROUND

The following relates generally to wireless communication, and more specifically to feedback transmission techniques in coordinated clusters of transmission reception points.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may use coordinated multipoint (CoMP) techniques in which a coordinated cluster of base stations within the system may coordinate the transmission and reception of communications between the base stations and the UEs of the system. The base stations may dynamically coordinate to provide joint scheduling and transmissions as well as joint processing of the received signals. In this way, a UE is able to be served by two or more base stations, which may help to improve transmission and reception signals and increase throughput. In cases where CoMP systems may experience latency or other communication issues between a UE and a base station, another base station of a coordinated cluster may be able to provide more reliable communication. Efficient techniques for use in a CoMP system that account for the performance demands of varying operating conditions may be desirable to help enhance system performance.

SUMMARY

The described techniques relate to improved methods, systems, devices, or apparatuses that support feedback transmission techniques in coordinated clusters of transmission reception points (TRPs), Various described techniques provide for multiple TRPs in a cluster that may coordinate scheduling and communications with a user equipment (UE). In some examples, different TRPs may allocate uplink resources for one or more UEs within a coordinated cluster to transmit feedback information that indicates whether a downlink transmission is successfully or unsuccessfully received at a UE. In some cases, a first TRP may provide a first set of resources that one or more associated UEs may use to transmit acknowledgment (ACK) feedback to indicate successful receipt of a downlink transmission of the first TRP. In some cases, one or more other TRPs of the coordinated cluster may provide a second set of resources that the one or more UEs may use to transmit negative acknowledgment (NACK) feedback to indicate that a downlink transmission of the first TRP was lost (e.g., unsuccessfully received). In some cases, the second set of resources may include non-orthogonal multiple access (NOMA) resources in which common uplink resources may be used for concurrent uplink transmissions from multiple UEs. In some cases, a TRP may allocate dedicated uplink resources for NACK transmissions from one or more high priority UEs that are served by a different TRP.

A method of wireless communication is described. The method may include determining, at a first UE, that a downlink transmission from a first TRP of a group of TRPs in a coordinated cluster is unsuccessfully received, identifying, at the first UE, a set of NOMA uplink resources for uplink transmissions to at least a second TRP of the group of TRPs, the set of NOMA uplink resources for transmitting NACK feedback to indicate unsuccessful receipt of the downlink transmission from the first TRP, and transmitting, based on the identifying, the NACK feedback to at least the second TRP using the set of NOMA uplink resources.

An apparatus for wireless communication is described. The apparatus may include means for determining, at a first UE, that a downlink transmission from a first TRP of a group of TRPs in a coordinated cluster is unsuccessfully received, means for identifying, at the first UE, a set of NOMA uplink resources for uplink transmissions to at least a second TRP of the group of TRPs, the set of NOMA uplink resources for transmitting NACK feedback to indicate unsuccessful receipt of the downlink transmission from the first TRP, and means for transmitting, based on the identifying, the NACK feedback to at least the second TRP using the set of NOMA uplink resources.

Another apparatus for wireless communication is described. The apparatus may include a processor, memory in electronic communication with the processor, and instructions stored in the memory. The instructions may be operable to cause the processor to determine, at a first UE, that a downlink transmission from a first TRP of a group of TRPs in a coordinated cluster is unsuccessfully received, identify, at the first UE, a set of NOMA uplink resources for uplink transmissions to at least a second TRP of the group of TRPs, the set of NOMA uplink resources for transmitting NACK feedback to indicate unsuccessful receipt of the downlink transmission from the first TRP, and transmit, based on the identifying, the NACK feedback to at least the second TRP using the set of NOMA uplink resources.

A non-transitory computer-readable medium for wireless communication is described. The non-transitory computer-readable medium may include instructions operable to cause a processor to determine, at a first UE, that a downlink transmission from a first TRP of a group of TRPs in a coordinated cluster is unsuccessfully received, identify, at the first UE, a set of NOMA uplink resources for uplink transmissions to at least a second TRP of the group of TRPs, the set of NOMA uplink resources for transmitting NACK feedback to indicate unsuccessful receipt of the downlink transmission from the first TRP, and transmit, based on the identifying, the NACK feedback to at least the second TRP using the set of NOMA uplink resources.

In some examples of the method, apparatus, and non-transitory computer-readable medium described herein, the NOMA uplink resources may be common resources that may be shared by a plurality of UEs that may concurrently transmit NACK feedback using the common resources. In some examples of the method, apparatus, and non-transitory computer-readable medium described herein, the identifying further includes identifying a second set of dedicated resources for uplink transmissions to the second TRP, the second set of dedicated resources being allocated to the first UE for transmitting critical NACK feedback to the second TRP.

Some examples of the method, apparatus, and non-transitory computer-readable medium described herein may further include processes, features, means, or instructions for identifying, at the first UE, a third set of uplink resources for uplink transmissions to the first TRP, the third set of uplink resources for transmitting ACK feedback to indicate successful receipt of the downlink transmission from the first TRP. In some examples of the method, apparatus, and non-transitory computer-readable medium described herein, the identifying the set of NOMA uplink resources includes identifying a single uplink resource for transmitting the NACK feedback to at least the second TRP and a third TRP of the coordinated cluster.

In some examples of the method, apparatus, and non-transitory computer-readable medium described herein, the identifying the set of NOMA uplink resources includes identifying a first subset of the set of NOMA uplink resources for transmitting the NACK feedback to the second TRP. Some examples of the method, apparatus, and non-transitory computer-readable medium described herein may further include processes, features, means, or instructions for identifying a second subset of the set of NOMA uplink resources for transmitting the NACK feedback to a third TRP of the coordinated cluster.

Some examples of the method, apparatus, and non-transitory computer-readable medium described herein may further include processes, features, means, or instructions for determining a transmission power for transmitting the NACK feedback. Some examples of the method, apparatus, and non-transitory computer-readable medium described herein may further include processes, features, means, or instructions for dividing the transmission power between the first subset and the second subset of the set of NOMA uplink resources when the first subset and the second subset of the set of NOMA uplink resources may be located within a same orthogonal frequency division multiplexing (OFDM) symbol.

Some examples of the method, apparatus, and non-transitory computer-readable medium described herein may further include processes, features, means, or instructions for determining a transmission power for transmitting the NACK feedback using the first subset and the second subset of the set of NOMA uplink resources. Some examples of the method, apparatus, and non-transitory computer-readable medium described herein may further include processes, features, means, or instructions for transmitting, using the determined transmission power, the NACK feedback using each of the first subset and the second subset of the set of NOMA uplink resources when the first subset and the second subset of the set of NOMA uplink resources may be located within a different OFDM symbols. Some examples of the method, apparatus, and non-transitory computer-readable medium described herein may further include processes, features, means, or instructions for receiving a semi-persistent scheduling (SPS) configuration from the first TRP that indicates downlink resources of the downlink transmission. In some examples of the method, apparatus, and non-transitory computer-readable medium described herein, the SPS configuration from the first TRP further includes an indication of the set of NOMA resources of at least the second TRP for transmitting the NACK feedback.

A method of wireless communication is described. The method may include configuring, at a first TRP of a group of TRPs in a coordinated cluster, a first set of uplink resources for feedback transmissions from at least a first of UE associated with the first TRP, and a second set of NOMA uplink resources for feedback transmissions from at least a second UE that is associated with a different TRP of the group of TRPs, transmitting an indication of the first set of uplink resources and the second set of uplink resources to the one or more different TRPs of the group of TRPs, and receiving, via the second set of NOMA uplink resources, a NACK feedback transmission from at least the second UE.

An apparatus for wireless communication is described. The apparatus may include means for configuring, at a first TRP of a group of TRPs in a coordinated cluster, a first set of uplink resources for feedback transmissions from at least a first of UE associated with the first TRP, and a second set of NOMA uplink resources for feedback transmissions from at least a second UE that is associated with a different TRP of the group of TRPs, means for transmitting an indication of the first set of uplink resources and the second set of uplink resources to the one or more different TRPs of the group of TRPs, and means for receiving, via the second set of NOMA uplink resources, a NACK feedback transmission from at least the second UE.

Another apparatus for wireless communication is described. The apparatus may include a processor, memory in electronic communication with the processor, and instructions stored in the memory. The instructions may be operable to cause the processor to configure, at a first TRP of a group of TRPs in a coordinated cluster, a first set of uplink resources for feedback transmissions from at least a first of UE associated with the first TRP, and a second set of NOMA uplink resources for feedback transmissions from at least a second UE that is associated with a different TRP of the group of TRPs, transmit an indication of the first set of uplink resources and the second set of uplink resources to the one or more different TRPs of the group of TRPs, and receive, via the second set of NOMA uplink resources, a NACK feedback transmission from at least the second UE.

A non-transitory computer-readable medium for wireless communication is described. The non-transitory computer-readable medium may include instructions operable to cause a processor to configure, at a first TRP of a group of TRPs in a coordinated cluster, a first set of uplink resources for feedback transmissions from at least a first of UE associated with the first TRP, and a second set of NOMA uplink resources for feedback transmissions from at least a second UE that is associated with a different TRP of the group of TRPs, transmit an indication of the first set of uplink resources and the second set of uplink resources to the one or more different TRPs of the group of TRPs, and receive, via the second set of NOMA uplink resources, a NACK feedback transmission from at least the second UE.

In some examples of the method, apparatus, and non-transitory computer-readable medium described herein, the first set of uplink resources may be configured for uplink transmissions of ACK feedback to indicate successful receipt of a first downlink transmission from the first TRP at the first UE, and the second set of NOMA uplink resources may be configured for uplink transmissions of NACK feedback from two or more other UEs that may be associated with the one or more different TRPs of the group of TRPs. In some examples of the method, apparatus, and non-transitory computer-readable medium described herein, the second set of NOMA uplink resources may include common resources for concurrent feedback transmissions from two or more other UEs that may be associated with one or more different TRPs of the group of TRPs.

Some examples of the method, apparatus, and non-transitory computer-readable medium described herein may further include processes, features, means, or instructions for determining that a third UE that may be associated with a different TRP of the group of TRPs may be a high priority UE. Some examples of the method, apparatus, and non-transitory computer-readable medium described herein may further include processes, features, means, or instructions for configuring a third set of uplink resources that may be dedicated to the third UE for uplink transmissions of NACK feedback from the third UE.

Some examples of the method, apparatus, and non-transitory computer-readable medium described herein may further include processes, features, means, or instructions for transmitting an indication of the second set of NOMA uplink resources, the third set of uplink resources, and one or more NOMA parameters, to the one or more different TRPs of the group of TRPs. In some examples of the method, apparatus, and non-transitory computer-readable medium described herein, the configuring the second set of NOMA uplink resources includes coordinating with the one or more different TRPs to identify a first subset of the second set of NOMA uplink resources for transmitting the feedback to the first TRP and a second subset of the second set of NOMA uplink resources for transmitting the feedback to a second TRP of the one or more different TRPs.

In some examples of the method, apparatus, and non-transitory computer-readable medium described herein, the second UE may be configured to divide an uplink transmission power between the first subset and the second subset of the second set of NOMA uplink resources when the first subset and the second subset of the second set of NOMA uplink resources may be located within a same OFDM symbol. In some examples of the method, apparatus, and non-transitory computer-readable medium described herein, the second UE may be configured to use a same uplink transmission power for uplink transmissions using the first subset and the second subset of the second set of NOMA uplink resources when the first subset and the second subset of the second set of NOMA uplink resources may be located within different OFDM symbols.

Some examples of the method, apparatus, and non-transitory computer-readable medium described herein may further include processes, features, means, or instructions for identifying an SPS configuration for two or more other UEs that may be associated with the one or more different TRPs of the group of TRPs, and where the configuring the second set of NOMA uplink resources may be based on the SPS configuration.

DETAILED DESCRIPTION

Figure 1:
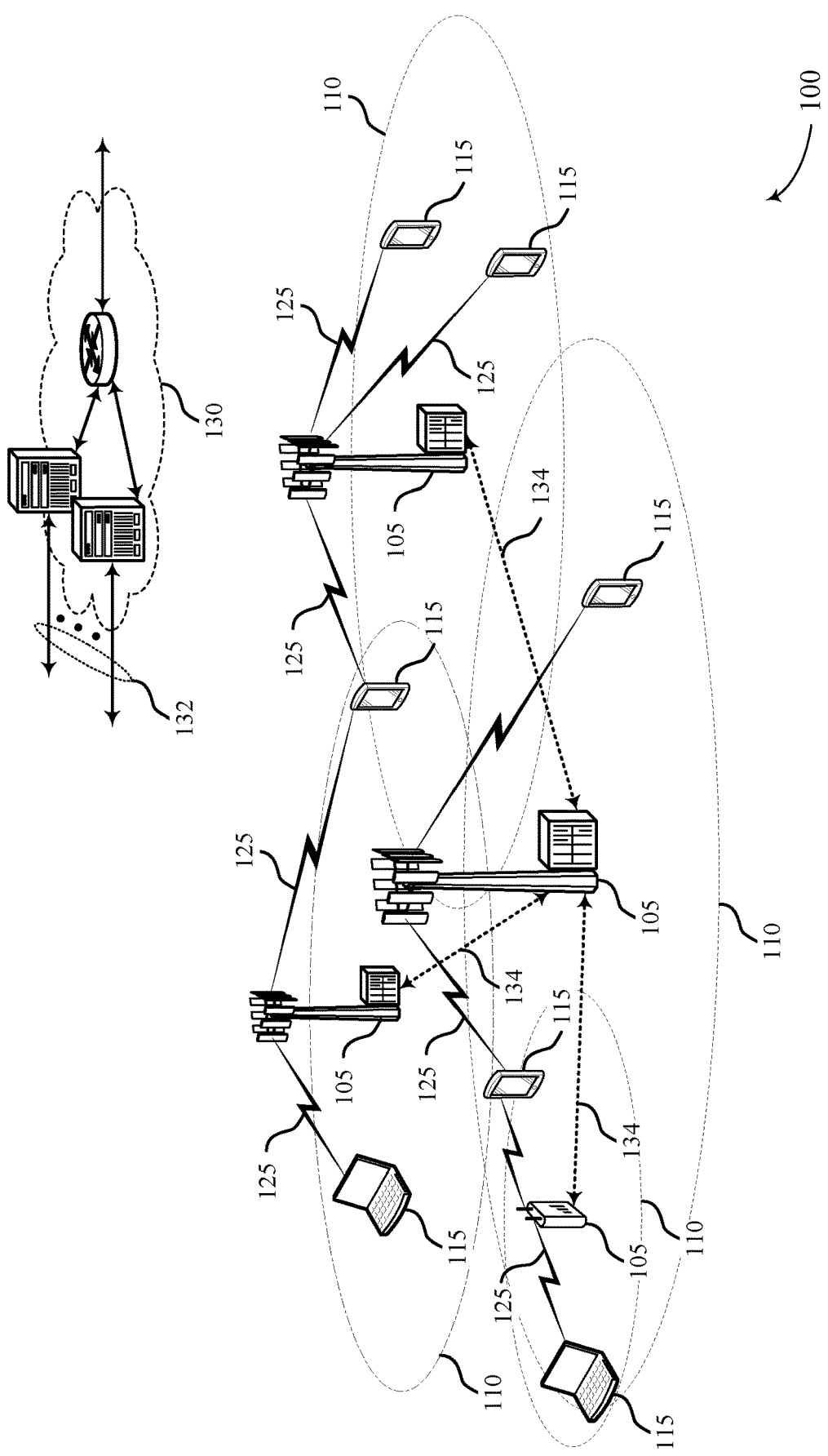
FIG. 1 illustrates an example of a system for wireless communication that supports feedback transmission techniques in coordinated clusters of transmission reception points in accordance with aspects of the present disclosure.

In a coordinated wireless communication system, multiple transmission reception points (TRPs) in a cluster may support communication with a user equipment (UE). The multiple TRPs may coordinate scheduling and communications with one another (e.g., directly via backhaul links or through a coordinating entity such as a base station or core network node). Various described techniques provide for multiple TRPs in a cluster to allocate uplink resources for one or more UEs within a coordinated cluster, where each UE may transmit feedback information indicating whether a downlink transmission is successfully or unsuccessfully received at a UE. In some cases, each TRP of a coordinated cluster may allocate a first set of uplink resources for acknowledgment (ACK) feedback (e.g., to indicate successful receipt of a downlink transmission), and may allocate a second set of uplink resources for negative acknowledgment (NACK) feedback (e.g., to indicate unsuccessful receipt of a downlink transmission). In some cases, the second set of uplink resources may include non-orthogonal multiple access (NOMA) resources in which common uplink resources may be used for concurrent uplink transmissions from multiple UEs.

In some cases, if a downlink transmission from a first TRP in a coordinated cluster to a first UE is successful, the first UE may transmit an ACK indication to the first TRP using the first set of resources. If the downlink transmission from the first TRP to the first UE is lost, the first UE may transmit a NACK indication to a different TRP in the coordinated cluster using the second set of resources. In some cases, transmission of the NACK to the different TRP may be based on the assumption that channel conditions between the first UE and the first TRP may be relatively poor, and that channel conditions between the first UE and the different TRP may be better. Each of the TRPs in the coordinated cluster may monitor for feedback messages using the configured sets of resources. If a feedback message indicating an unsuccessful reception is received at the different TRP, the different TRP may retransmit the lost downlink transmission.

In some cases, such feedback techniques may be used in wireless communications systems that implement ultra-reliable low latency communications (URLLC), which may allow for increased data rates and higher throughput for wireless communications. Some systems may provide for a high reliability rate (e.g., $10^{-6}$ error rate) within a 1-10 millisecond (ms) cycle time, such as in an Internet of Things (IoT) system. For example, UEs within some industrial IoT settings may communicate periodic traffic within deterministic synchronous cycles. These UEs may transmit and receive small payloads, which may allow for a large number of UEs to operate within the IoT system. Backhaul links, such as those between different TRPs in the IoT system, may be fast, reliable, and deterministic (e.g., Time-Sensitive Networking (TSN) and/or Integrated Access and Backhaul (IAB)), allowing for communications between TRPs to have high throughput and data rates.

UEs operating in the IoT system, however, may also be limited to a short communication range and may face challenging propagation scenarios due to the nature of the operating environment. For example, in some industrial IoT settings, there may be fast moving parts, machines, or devices within a particular operating environment, which may result in fast shadowing and interference. Further, UEs may experience interference from faraway transmissions, which may vary rapidly due to reflection within the industrial environment. Additionally, the mobility of the UEs may be limited in terms of speed, range, and randomness. Due to the difficult environment of such industrial IoT systems, some systems may provide that spatial reuse may be utilized for URLLC communications. Spatial reuse, however, may require coordinated communications between various TRPs (e.g., in a coordinated multi-point (CoMP) system) to ensure that spatial reuse efforts may not inadvertently increase inter-cell interference (ICI).

The described techniques relate to the coordinated clusters in a coordinated multipoint (CoMP) system. By leveraging the communication links in an IoT system (e.g., backhaul communication links), one or more UEs in the CoMP system may be within a coverage area supported by multiple TRPs. In some cases, clusters may overlap and different frequencies may be utilized to mitigate interference between different clusters. Each coordinated cluster may support communication for a UE via multiple TRPs and a single TRP may be part of multiple clusters. To support communications over different clusters, a TRP may be configured to communicate using resources specified for each cluster. In some examples, the TRP may be an independent base station. In further examples, a group of TRPs may be controlled by a single base station or coordinating entity (e.g., a grand master).

In some cases, a UE within a coordinated cluster of the CoMP system may experience changes in channel conditions that may result in a downlink transmission from a TRP within the cluster being lost and not successfully received at the UE. The various techniques described herein may provide for different TRPs to allocate uplink resources for one or more UEs within a coordinated cluster and to transmit feedback information for downlink transmissions. Such techniques may allow a UE to transmit feedback in a relatively robust manner that has a relatively high likelihood of being received, and thus an appropriate retransmission may be attempted that may allow the system to maintain the relatively strict timelines associated with URLLC systems. Techniques provided herein may also use NOMA resources for uplink NACK transmissions, which may allow efficient use of wireless resources by a number of different UEs with reliable likelihood that the uplink transmissions will be successfully received. In some cases, a TRP may allocate dedicated uplink resources for NACK transmissions from one or more high priority UEs served by a different TRP. Such allocated uplink resources may provide high priority UEs the ability to transmit NACK indications with a lower likelihood of interference from other UEs.

Aspects of the disclosure are initially described in the context of a wireless communications system. Aspects of the disclosure are further illustrated by and described with reference to apparatus diagrams, system diagrams, and flowcharts that relate to feedback transmission techniques in coordinated clusters of transmission reception points.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may be configured in coordinated clusters in which base stations 105 may allocate uplink resources for feedback transmissions from different UEs 115 in accordance with techniques such as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some examples, the wireless communications system 100 may use CoMP techniques for UEs 115 operating within a coverage area of multiple base stations 105, or TRPs. In some cases, CoMP techniques may employ coordinated scheduling (CS) and coordinated beamforming (CB). Systems employing CS may divide a network into multiple clusters. Each cluster may employ centralized scheduling in order to determine which TRPs 105 within the cluster communicate with a UE 115 in each time duration (e.g., subframe, slot, mini-slot, symbol). Systems employing CB may calculate power level and beamforming coefficients in order to achieve common signal to interference plus noise ratios (SINRs) in the system or to improve the minimum SINR for one or more UEs 115. This may be referred to as dynamic point blanking (DPB). In CS/CB systems, the multiple TRPs 105 may share channel state information (CSI) for various UEs 115, while data packets specific to a UE 115 data packets may be provided by a single TRP 105. For example, in a system supporting semi-static point selection (SSPS), a first TRP 105 may send a first data packet to a UE 115 and a second TRP 105 may send a second data packet to the UE 115, but a single data packet may not be sent by more than one TRP 105.

In some cases, wireless communications system 100 may be a CoMP system that employs joint-processing (JP). In a JP-CoMP system, data may be available for a UE 115 at more than one TRP 105 for the same time-frequency resources. JP-CoMP systems may be classified into joint transmission (JT) systems and dynamic point selection (DPS) systems. In JT-CoMP systems, multiple TRPs 105 may transmit data to the UE 115 simultaneously. The multiple TRPs 105 may each send the same data to the UE, which may provide a more powerful signal at the UE 115. Additionally or alternatively, each TRP 105 may send different data, which the UE 115 may combine in order to receive more data or additional coded bits corresponding to a data packet to correct bit errors (e.g., in a HARQ procedure).

A CoMP-DPS system may allow a UE 115 to be dynamically scheduled by the TRP 105 having sufficient (e.g., highest) channel quality conditions for communications with the UE 115. This dynamic scheduling may be done by exploiting changes in the channel fading condition. In a CoMP-DPS system, transmission of beamformed data may be performed at a single TRP 105. The selected TRP 105 may notify the other cooperating TRPs 105 (e.g., via an X2 interface) of its communications with the UE 115. This notification may cause the cooperating TRPs 105 to mute the resources that the selected TRP 105 may use for communications with the UE 115. In some examples, the notification via the X2 interface may between 20 ms and 40 ms to be delivered to the cooperating TRPs 105, which may be relatively slow compared to other communications links between multiple TRPs 105.

In CoMP-DPS communication systems, the communications between a TRP 105 and a UE 115 may experience shadowing. Shadowing may occur when the received power of a signal fluctuates due to objects obstructing the propagation path between a TRP 105 and a UE 115. In some wireless communications systems, shadowing may be relatively slow when compared to intra-TRP 105 communications. In order to overcome this, a UE 115 may strategically choose a TRP 105 such that communications may be maintained. However, in some cases, communications between a TRP 105 and a UE 115 may experience fast shadowing. Fast shadowing may occur when communications between a TRP 105 and a UE 115 experience frequent and sizeable changes in shadowing. For example, a UE 115 in an industrial environment may experience reflection (e.g., as a result of blockage from some moving physical object such as a robotic arm). In such an example, the decorrelation distance may be as small 0.2 m which may translate to 10 ms of blockage given a UE 115 speed of 20 m/s.

In some cases, a UE 115 may not be able to successfully receive or decode a transmission from a first TRP 105, and may transmit a NACK as part of a HARQ procedure to indicate the failed reception or decoding. In some other cases, a retransmission may be sent from a TRP 105 different from the first TRP 105. If the UE 115 successfully receives and decodes the retransmission from the new TRP 105, UE 115 may send an ACK response. Various techniques discussed herein provide that a UE 115 may transmit NACK indications using uplink resources of the new TRP 105, which may include NOMA resources.

Figure 2:
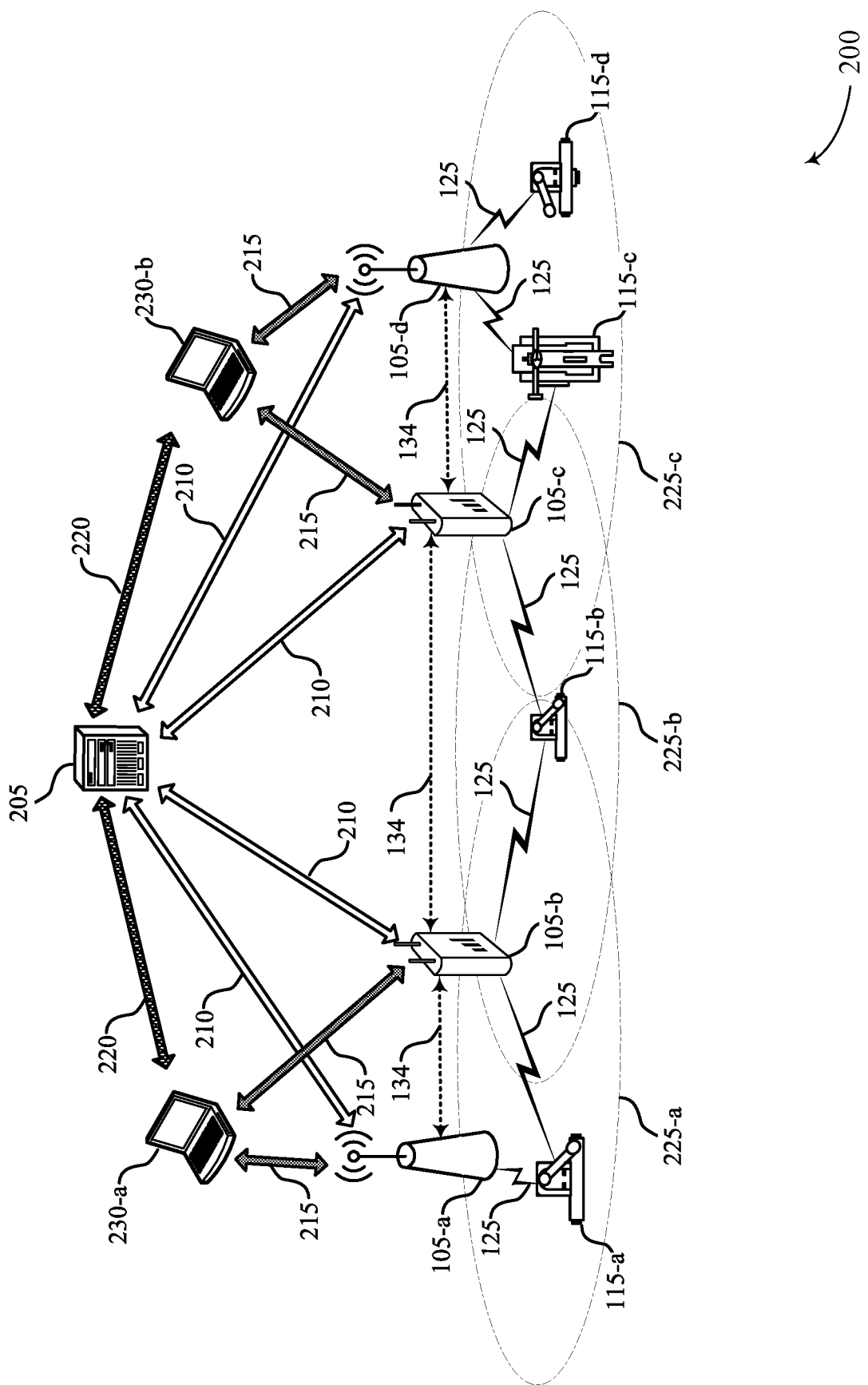
FIG. 2 illustrates an example of a portion of a wireless communication system that supports feedback transmission techniques in coordinated clusters of transmission reception points in accordance with aspects of the present disclosure.

FIG. 2 illustrates an example of a portion of a wireless communications system 200 that supports feedback transmission techniques in coordinated clusters of transmission reception points in accordance with various aspects of the present disclosure. In some examples, wireless communications system 200 may implement aspects of wireless communication system 100. In wireless communications system 200, a coordinating entity 205 (e.g., a grand master, a multicell/multicast coordination entity (MCE), a node within the core network 130, etc.) may determine a number of coordinated clusters 225 for communications with a number of different UEs 115. In some cases, the wireless communications system 200 may be located in an industrial setting, and each of the UEs 115 may be associated with a piece of equipment within the industrial setting, although techniques provided herein may be used in any of a number of other deployment scenarios.

In the example of FIG. 2, each coordinated cluster 225 may include multiple TRPs 105 capable of communicating with one or more UEs 115 within the coordinated cluster 225. The TRPs 105 may be any one of a base station, an eNB, a gNB, an IoT gateway, a cell, etc. In some examples, the coordinated clusters 225 may be determined based on measurements of channel conditions (or other statistics) between the UEs 115 and one or more TRPs 105. As shown in FIG. 2, TRPs 105-a and 105-b support communications with multiple UEs 115, such as UE 115-a within coordinated cluster 225-a. TRPs 105-b and 105-c support communications with multiple UEs 115, such as UE 115-b within coordinated cluster 225-b. TRPs 105-c and 105-d support communications with multiple UEs 115, such as UEs 115-c and 115-d within coordinated cluster 225-c.

The TRPs 105 may communicate with a management system (e.g., a coordinating entity 205) via links 210, which may configure the different coordinated clusters 225, in some examples. The management system may include, for example, an industrial PC which may provide controller programming for different UEs 115, software and security management of the wireless communications system 200, long term key performance indicator (KPI) monitoring, among other functions. In the example of FIG. 2, the TRPs 105 may also communicate with human-machine-interfaces (HMIs) 230 via communications links 215 and HMIs 230 may communicate with coordinating entity 205 (or other management system) via links 220. HMIs 230 may include, for example, tablet computers, control panels, wearable devices, control computers, and the like, which may provide control for different equipment within the system (e.g., start/stop control, mode change control, augmented or virtual reality control, etc., for a piece of equipment that may include a UE 115).

In some cases, TRPs 105 may include programmable logic controllers (PLCs) that may issue a series of commands (e.g., motion commands for a piece of equipment), receive sensor inputs (e.g., position of a robotic arm of a piece of equipment), and coordinate with other PLCs. In such cases, the wireless communications between the TRPs 105 and UEs 115 may need to provide near real-time information, and may use URLLC communications techniques. In such cases, inter-TRP 105 communications may have somewhat more relaxed latency requirements, and communications between the TRPs 105 and coordinating entity 205 or HMIs 230 may have even more related latency requirements and may use, for example, eMBB communications techniques.

In some cases, the TRPs 105 that are members of a given coordinated cluster 225 may change. For instance, the channel conditions for a UE 115 may change over time due to location of the UE 115, speed or movement of the UE 115, interference or signal quality variations between a UE 115 and one or more TRPs 105. In such cases, periodic or aperiodic (e.g., triggered) measurement reports may be sent from a UE 115 to one or more TRPs 105. The TRPs 105 may coordinate amongst themselves or may be coordinated by a separate entity (e.g., a coordinating entity 205) to determine which TRPs 105 are to support communication for a coordinated cluster 225 of the UE 115. The coordinating entity 205 may inform the TRPs 105 of this determination, and the TRPs 105 selected for the cluster may communicate with the UEs 115 over the same set of time-frequency resources.

In some cases, the coordinating entity 205 may also assign a resource pool of each of the set of TRPs 105 based on the channel condition measurements. The selected TRPs of a dynamic cluster, such as the TRPs 105-c and 105-d in a coordinated cluster 225-c, may use different resources (e.g., different physical resource blocks (PRBs)) for communications with associated UEs 115. The UEs 115 may also be signaled on a dedicated downlink resource of a resource pool to use in communication in their assigned coordinated cluster 225 and associated resources for downlink and uplink transmissions. The UEs 115 may be signaled by the coordinating entity 205 or one more TRPs 105 in the coordinated clusters 225.

As indicated herein, in some cases, within coordinated cluster 225, communications between TRP 105 and UE 115 may experience fast shadowing or fast fading. Fast shadowing may occur when communications between a TRP 105 and a UE 115 experience frequent and sizeable changes in shadowing. For example, in some cases, the UE 115 may be in an industrial environment and experience reflection (e.g., as a result of blockage from some moving physical object such as a robotic arm).

In a fast shadowing or fading environment, downlink transmission from a TRP 105 to a UE 115 may be lost (e.g., not successfully received) at the UE 115. For example, within coordinated cluster 225-a, a first TRP 105-a may transmit a downlink transmission to a first UE 115-a, which may not be successfully received at the UE 115-a (e.g., due to fast shadowing or fast fading caused by a nearby piece of equipment). In some cases, the first UE 115-a may transmit a NACK feedback indication to the second TRP 105-b after such a failed or unsuccessful decoding of a transmission from the first TRP 105-a. In response, the second TRP 105-b may send a retransmission to the first UE 115-a. In this example, the TTI may be short enough that many HARQ transmissions may be impacted by the same fast shadowing or fast fading, therefore if UE 115-a transmits the NACK feedback to the first TRP 105-a, multiple successive retransmissions may be unsuccessful. Thus, transmission of the NACK feedback to the second TRP 105-b may help enhance operation of the wireless communications system 200. The first UE 115-a may successfully receive and decode the retransmission from the second TRP 105-b and send an ACK response. In this way, wireless communications system 200 may employ HARQ procedures that utilize DPS during retransmission. Examples of uplink resources that may be provided by different TRPs 105 are discussed in more detail with respect to FIG. 3.

Figure 3:
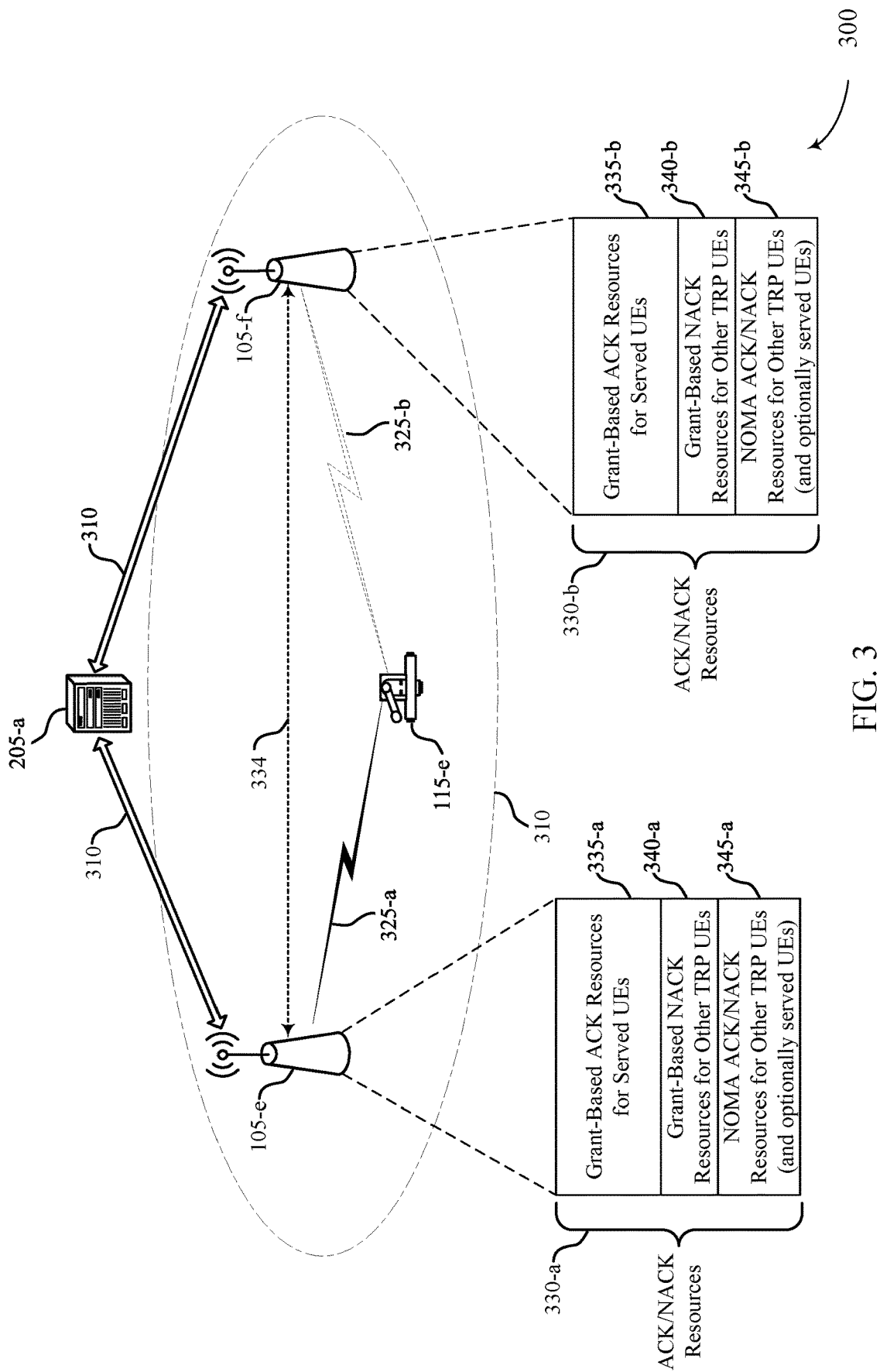
FIG. 3 illustrates an example of a coordinated cluster that supports feedback transmission techniques in coordinated clusters of transmission reception points in accordance with aspects of the present disclosure.

FIG. 3 illustrates an example of a portion of a wireless communications system 300 that supports feedback transmission techniques in coordinated clusters of transmission reception points in accordance with various aspects of the present disclosure. In some examples, wireless communications system 300 may implement aspects of wireless communication system 100. In wireless communications system 300, UE 115-e may be assigned to a coordinated cluster 310 served by TRPs 105-e and 105-f. A first TRP 105-e may be a primary TRP that may perform communications with UE 115-e. In some aspects, a second TRP 105-f may be a secondary TRP that may only perform communications with UE 115-e in certain situations. Coordinating entity 205-a may manage multiple coordinated clusters 310 that may each include a number of different TRPs 105 and UEs 115. Communications between the coordinating entity 205-a and the TRPs 105-e and 105-f may occur via communication links 310, and the first TRP 105-e may communicate with the second TRP 105-f via channel 334 which may be an example of a backhaul link, TSN or other fast Ethernet-based network. In some examples, this communication channel 334 may operate at high speeds (e.g., 10 ns).

UE 115-e may be in communication with TRP 105-e via communication link 325-a. In some cases, communication link 325-a between UE 115-e and TRP 105-e may experience shadowing, which may result in a decreased received power of a signal communicated via communication link 325-*a*. The shadowing may be, for example, fast shadowing which may occur in an industrial IoT (IIoT) environment, for instance, due to various physical obstacles (e.g., due to a mechanical arm or other fast moving parts in the area). As a result of the shadowing, UE 115-*e* may not successfully receive or decode a transmission sent via communication link 325-*a* from TRP 105-*e*. As a result, UE 115-*e* may transmit a feedback message (e.g., a NACK message) in response to the unsuccessful reception indicating that the transmission was not received successfully. As discussed herein, the conditions that resulted in the downlink transmission not being successfully received at the UE 115-*e* may continue to be present when the UE 115-*e* transmits the NACK feedback message, and in some cases the UE 115-*e* may transmit the NACK feedback via communication link 325-*b* to the second TRP 105-*f*. The NACK message may be received by the second TRP 105-*f* and provided to coordinating entity 205-*a* and TRP 105-*f*. For example, UE 115-*e* may transmit a NACK message to the second TRP 105-*f* via ACK/NACK resources 330-*b* that may be allocated by the second TRP 105-*f* In some cases, coordinating entity 205-*a* may also monitor these resources for a feedback message from the UE 115-*e*.

In order to provide uplink resources for ACK/NACK feedback transmissions, each TRP 105 may allocate ACK/NACK resources 330. In some cases, the ACK/NACK resources 330 may include a mix of grant-based and grant-free ACK/NACK resources that may be utilized in handling NACK responses from UEs 115 of other TRPs 105 in the coordinated cluster 310. The ACK/NACK resources 330 may also be used as grant-based resources that may be utilized for handling ACK responses of UEs 115 of a particular TRP 105. In the example of FIG. 3, the first TRP 105-*e* may allocate ACK/NACK resources 330-*a* for uplink ACK/NACK transmissions from the UE 115-*e* as well as for other UEs that may be served by the first TRP 105-*e* or any other TRPs 105. The ACK/NACK resources 330-*a* of the first TRP 105-*e* may include grant-based ACK resources 335-*a* for served UEs 115, grant-based NACK resources 340-*a* for UEs 115 of other TRPs 105, and NOMA ACK/NACK resources 345-*a* for UEs 115 of other TRPs 105. In some cases, served UEs such as UE 115-*e* may utilize the NOMA ACK/NACK resources 345-*a* for uplink ACK/NACK transmissions. In this example, the second TRP 105-*f* may also allocate ACK/NACK resources 330-*b* that include grant-based ACK resources 335-*b* for served UEs 115, grant-based NACK resources 340-*b* for UEs of other TRPs 105, and NOMA ACK/NACK resources 345-*b* for UEs 115 of other TRPs 105 (and optionally for served UEs for ACK/NACK transmissions).

In some cases, the grant-based NACK resources 340 may be allocated to critical UEs, such as UEs that are identified by coordinating entity 205-*a* as being high priority (e.g., UEs associated with sensitive time-critical processing equipment) or other TRPs 105 in the coordinated cluster 310. Providing such critical UEs with dedicated grant-based NACK resources 340 may allow NACK transmissions to have a higher likelihood of receipt. In some cases, UE 115-*e* may be allocated resources for downlink and uplink transmissions via a semi-persistent scheduling (SPS) grant, which may include the allocated ACK/NACK resources 330 for each TRP 105 within the coordinated cluster 310. For example, the first TRP 105-*f* may transmit an indication of the grant-based ACK resources 335-*a*, and, in the case that the UE 115-*e* is identified as a critical UE, the grant-based NACK resources 340-*b* of the second TRP 325-*b*. In cases where the UE 115-*e* is not identified as a critical UE, the first TRP 105-*e* may provide the UE 115-*e* with an indication of the NOMA ACK/NACK resources 345-*b* of the second TRP 105-*f*. In some cases, the indication of the NOMA ACK/NACK resources 345-*b* may also include one or more NOMA parameters that the UE 115-*e* may use for a NOMA transmission, such as an orthogonal cover code (OCC) that the UE 115-*e* may apply to a NOMA uplink transmission, channel coding for the NOMA uplink transmissions, etc.

The TRPs 105 may monitor the ACK/NACK resources 330 for feedback transmissions, including the NOMA ACK/NACK resources 345 which may include multiple concurrent transmissions from two or more UEs 115. NOMA techniques that enable the recovery of multiple concurrent transmissions include, for example, successive interference cancellation (SIC), multi-user decoders (MUDs), resource spread multiple access (RSMA), or combinations thereof. A MUD may use SIC techniques to decode a first, relatively strong, signal from a first transmitter and may subtract the first signal from the received signal, decode a second signal from a second transmitter, and so on. RSMA techniques may utilize lower rate channel coding to spread a transmitted signal across resources. Gains obtained from the channel coding may lead to robust transmissions, and may also be well suited for sporadic transmissions of small non-orthogonal data bursts. For example, RSMA techniques may benefit systems that support MTC, enhanced MTC (eMTC), narrowband Internet of Things (NB-IoT) communications, and the like. In such cases, signals from multiple transmitting devices may be recovered simultaneously, even in the presence of mutual interference.

Thus, in this example, if the UE 115-*e* successfully receives a downlink transmission, it may transmit an ACK indication using grant-based ACK resources 335-*a* (or optionally using NOMA ACK/NACK resources 345-*a*) to the first TRP 105-*e*. If, however, the UE 115-*e* does not successfully receive the downlink transmission, the UE may transmit a NACK indication to the second TRP 105-*f* using either the grant-based NACK resources 340-*b* or the NOMA ACK/NACK resources 345-*b*. While the example of FIG. 3 illustrates two TRPs 105, one or more other TRPs may also be present in the coordinated cluster 310, and the UE 115-*e*, in the event of a NACK transmission, may transmit the NACK transmission to one or more other TRPs in addition to or alternatively to the NACK transmission to the second TRP 105-*f*. Such other TRPs may also have configured ACK/NACK resources 330.

In some cases, the grant-based NACK resources 340 or the NOMA ACK/NACK resources 345 may be a single dedicated/NOMA resource (e.g., resources on a same symbol) that may be used to transmit a NACK indication to multiple other TRPs. In other cases, different TRPs 105 may use different grant-based NACK resources 340 or different NOMA ACK/NACK resources 345 (e.g., the resources of different TRPs may be on different symbols). In cases where the uplink resources are on the same symbol, the UE 115-*e* may perform a transmission power split to divide the uplink transmission power between the different uplink resources. In cases where the uplink resources are on different symbols, the UE 115-*e* may not perform any power adjustment for the uplink transmission power.

Figure 4:
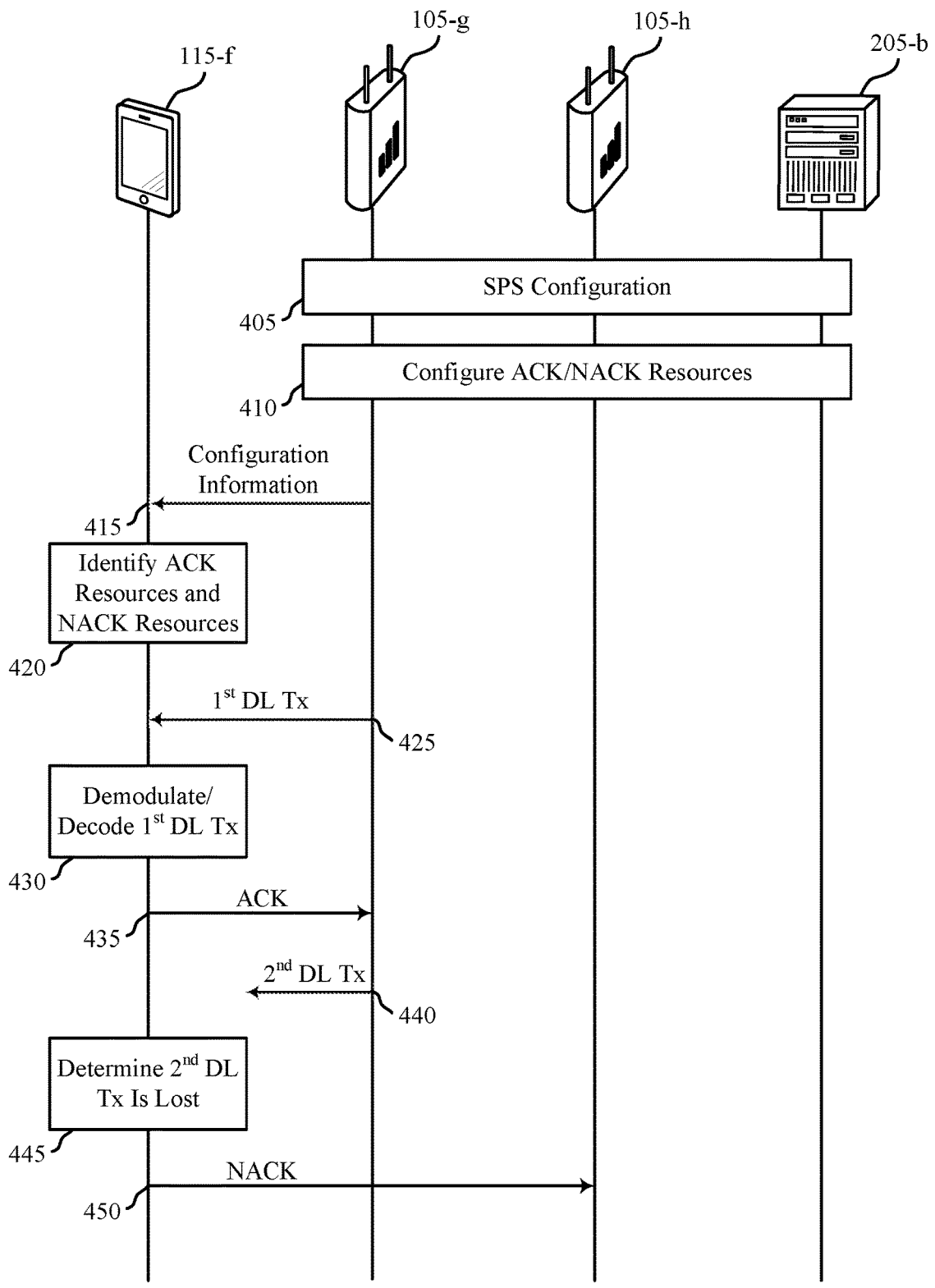
FIG. 4 illustrates an example of a process flow that supports feedback transmission techniques in coordinated clusters of transmission reception points in accordance with aspects of the present disclosure.

FIG. 4 illustrates an example of a process flow 400 that supports feedback transmission techniques in coordinated clusters of transmission reception points in accordance with various aspects of the present disclosure. In some examples, process flow 400 may implement aspects of wireless communication system 100. As shown, process flow 400 may be implemented by a UE 115-*f*, a first TRP 105-*g*, a second TRP 105-*h*, and coordinating entity 205-*b*, each of which may examples of the corresponding devices described herein. In this example, TRPs 105-*g* and 105-*h* are part of a coordinated cluster (e.g., in a coordinated wireless communications system) that support communications with UE 115-*f*, in addition to one or more other UEs.

At 405, coordinating entity 205-*b*, the first TRP 105-*g* and the second TRP 105-*h* may perform an SPS configuration for one or more served UEs within the coordinated cluster. The SPS configuration process may include, for example, identifying a TRP within the coordinated cluster that is to be the primary TRP for the UE 115-*f*, allocation of SPS downlink resources for periodic downlink transmissions from the first TRP 105-*g* to the UE 115-*f*, and allocation SPS uplink resources for uplink transmissions from the UE 115-*f* to the first TRP 105-*g*.

At 410, the coordinating entity 205-*b*, the first TRP 105-*g* and the second TRP 105-*h* may configure ACK/NACK resources. As discussed herein, the ACK/NACK resources of each TRP 105 may include uplink resources for ACK transmissions for one or more UEs that are associated with a particular TRP 105, as well as uplink resources for NACK transmission of other URs that are associated with other different TRPs. In the example of FIG. 4, the ACK/NACK resources may include grant-based NACK resources of the second TRP 105-*h* as well an NOMA ACK/NACK resources of the second TRP 105-*h*. In cases where the ACK/NACK resources include NOMA ACK/NACK resources, the resource configuration may include configuration of one or more NOMA parameters that different UEs may use for NOMA transmission (e.g., an OCC, NOMA resources, spreading sequences, etc., for different UEs of the coordinated cluster).

The first TRP 105-*f* may transmit configuration information 415 to the UE 115-*f*. The configuration information 415 may include the SPS configuration as well as an indication of the configured ACK/NACK resources of the first TRP 105-*g* and the second TRP 105-*h* (and any other TRPs that may be configured to receive a NACK transmission from the UE 115-*f*).

At 420, the UE 115-*f* may identify ACK resources and NACK resources based on the configuration information. As discussed herein, the ACK resources may be uplink resources of the first TRP 105-*g* that may be used for uplink ACK transmissions to confirm successful reception and decoding of downlink transmissions of the first TRP 105-*h*. The NACK resources may be uplink resources of the second TRP 150-*h* (and optionally one or more other TRPs of the coordinated cluster) that may be used to transmit a NACK indication. In some cases, the NACK resources may include grant-based dedicated NACK resources for the UE 115-*f*, or may include NOMA resources of the second TRP 105-*h*.

The first TRP 105-*g* may transmit a first downlink transmission 425, which in this example may be received at the UE 115-*f*. The UE 115-*f*, at 430, may successfully demodulate and decode the first downlink transmission. Upon successfully demodulating and decoding the first downlink transmission, the UE 115-*f* may transmit an ACK indication 435 to the first TRP 105-*g*. The ACK indication 435 may be transmitted using the configured uplink ACK resources of the first TRP 105-*g*.

The first TRP 105-*g* may then transmit a second downlink transmission 440, which in this example the UE 115-*f* may not receive. The UE 115-*f*, at 445, may determine that the second downlink transmission is lost (e.g., not successfully received). Such a determination may be made based on the allocated downlink resources that were allocated in the SPS configuration, and being unable to successfully decode a transmission from the first TRP 105-*g* from the allocated resources. Upon determining that the second downlink transmission was lost, the UE 115-*f* may transmit a NACK indication 450 to the second TRP 105-*h*. The NACK indication 450 may be transmitted using the configured uplink NACK resources of the second TRP 105-*h*. In cases where the UE 115-*f* is a high priority UE, the NACK resources may include grant-based NACK resources allocated at the second TRP 105-*h* for the UE 115-*f*. In other cases, the NACK resources may include NOMA resources, and the UE 115-*f* may transmit the NACK indication using the NOMA resources using one or more NOMA parameters configured at the UE 115-*f*. The second TRP 105-*h* may coordinate with the coordinating entity 205-*b* and/or the first TRP 105-*g*, and may perform a retransmission of the second downlink transmission to the UE 115-*f*.

Figure 5:
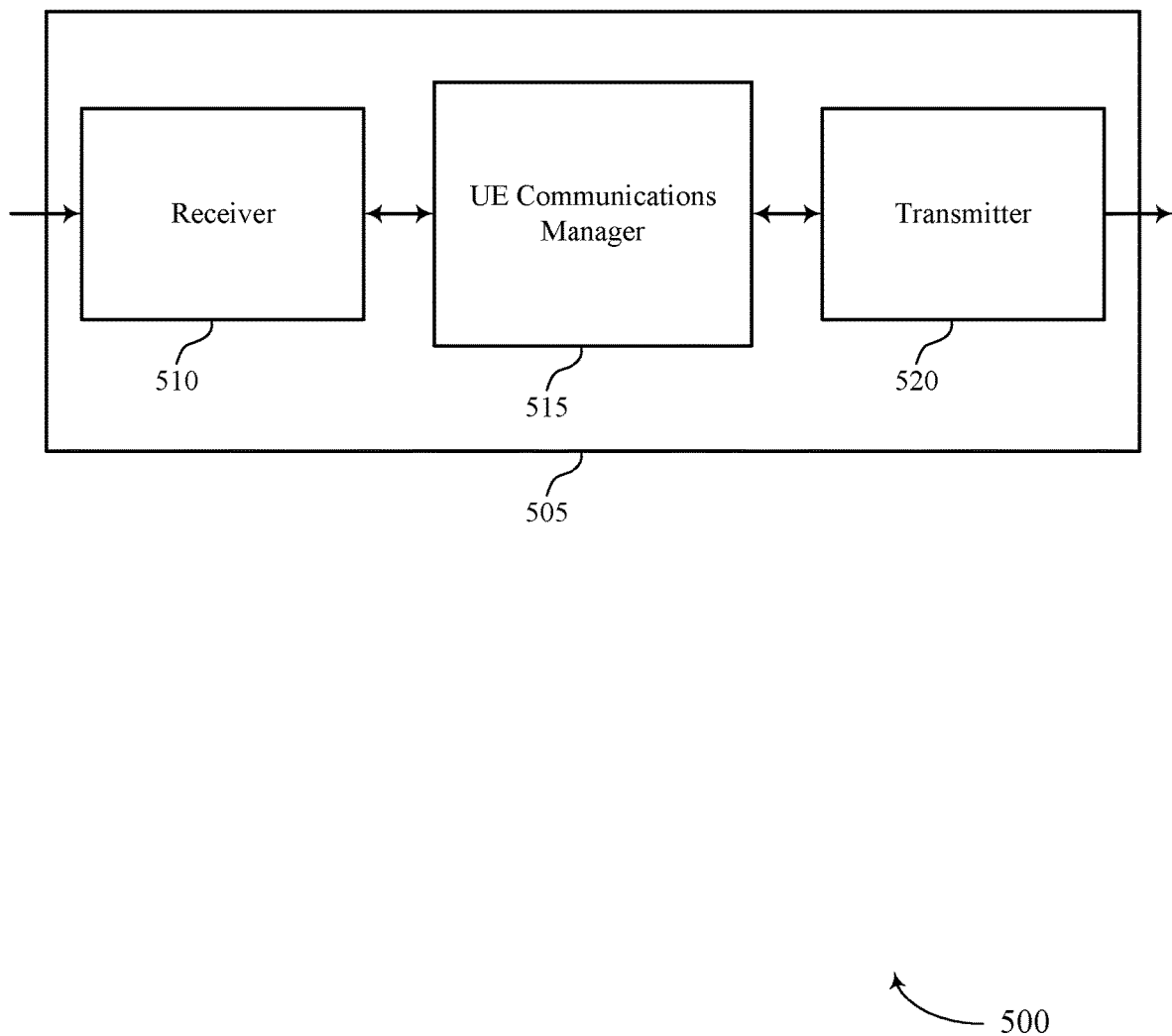
FIGS. 5 through 7 show block diagrams of a device that supports feedback transmission techniques in coordinated clusters of transmission reception points in accordance with aspects of the present disclosure.

FIG. 5 shows a block diagram 500 of a wireless device 505 that supports feedback transmission techniques in coordinated clusters of transmission reception points in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to feedback transmission techniques in coordinated clusters of transmission reception points, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may determine that a downlink transmission from a first TRP of a group of TRPs in a coordinated cluster was unsuccessfully received, identify a set of NOMA uplink resources for uplink transmissions to at least a second TRP of the group of TRPs, the set of NOMA uplink resources for transmitting NACK feedback to indicate unsuccessful receipt of the downlink transmission from the first TRP, and transmit, based on the identifying, the NACK feedback to at least the second TRP using the set of NOMA uplink resources.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
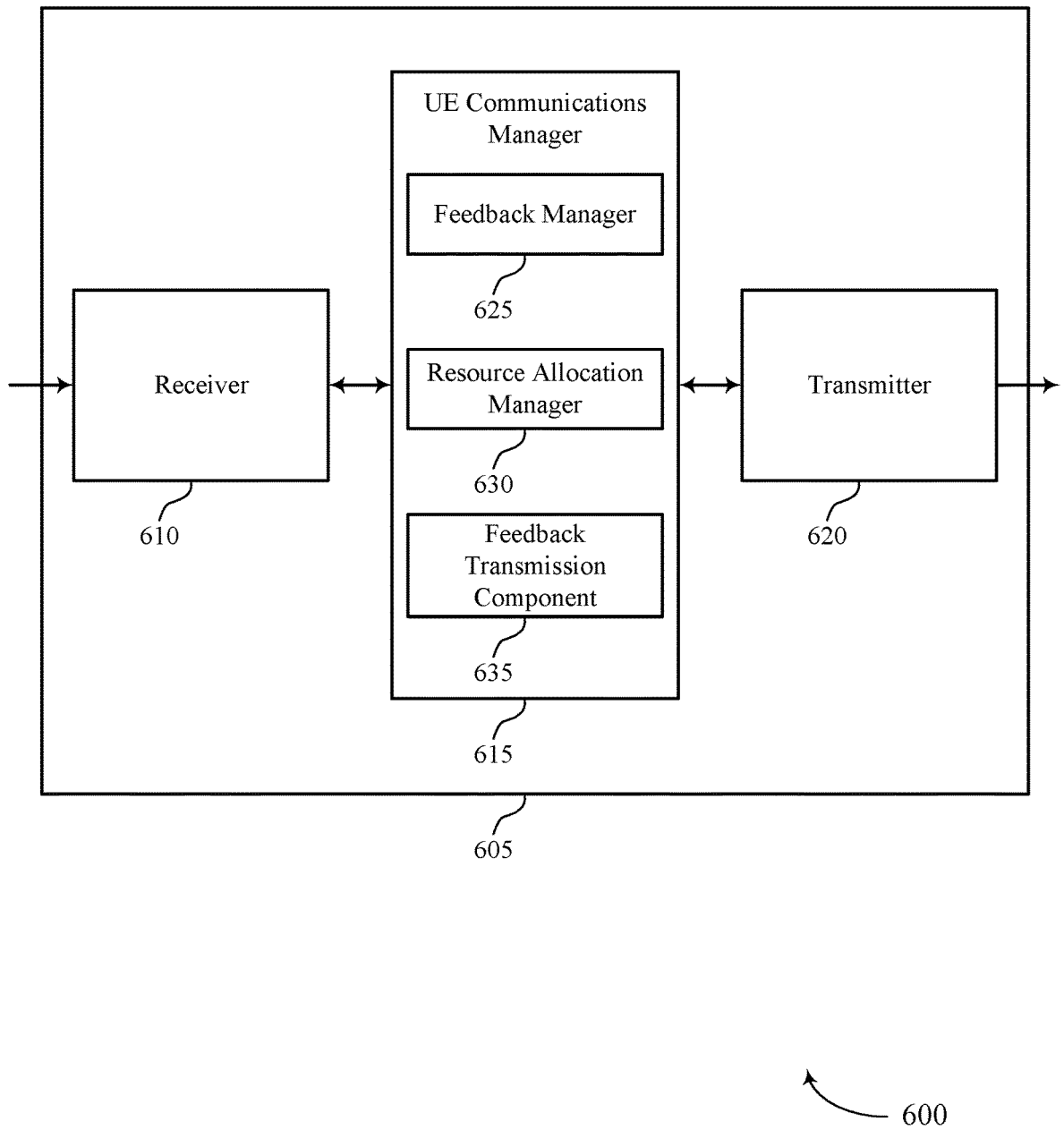

FIG. 6 shows a block diagram 600 of a wireless device 605 that supports feedback transmission techniques in coordinated clusters of transmission reception points in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to feedback transmission techniques in coordinated clusters of transmission reception points, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include feedback manager 625, resource allocation manager 630, and feedback transmission component 635.

Feedback manager 625 may determine that a downlink transmission from a first TRP of a group of TRPs in a coordinated cluster is unsuccessfully received.

Resource allocation manager 630 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. In some cases, resource allocation manager 630 may identify a third set of uplink resources for uplink transmissions to the first TRP, the third set of uplink resources for transmitting ACK feedback to indicate successful receipt of the downlink transmission from the first TRP. In some cases, resource allocation manager 630 may identify a second subset of the set of NOMA uplink resources for transmitting the NACK feedback to a third TRP of the coordinated cluster. In some cases, the NOMA uplink resources are common resources shared by a set of UEs that may concurrently transmit NACK feedback using the common resources. In some cases, the identifying further includes identifying a second set of dedicated resources for uplink transmissions to the second TRP, the second set of dedicated resources allocated to the first UE for transmitting critical NACK feedback to the second TRP. In some cases, the identifying the set of NOMA uplink resources includes identifying a single uplink resource for transmitting the NACK feedback to at least the second TRP and a third TRP of the coordinated cluster. In some cases, the identifying the set of NOMA uplink resources includes identifying a first subset of the set of NOMA uplink resources for transmitting the NACK feedback to the second TRP.

Feedback transmission component 635 may transmit, based on the identifying, the NACK feedback to at least the second TRP using the set of NOMA uplink resources.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
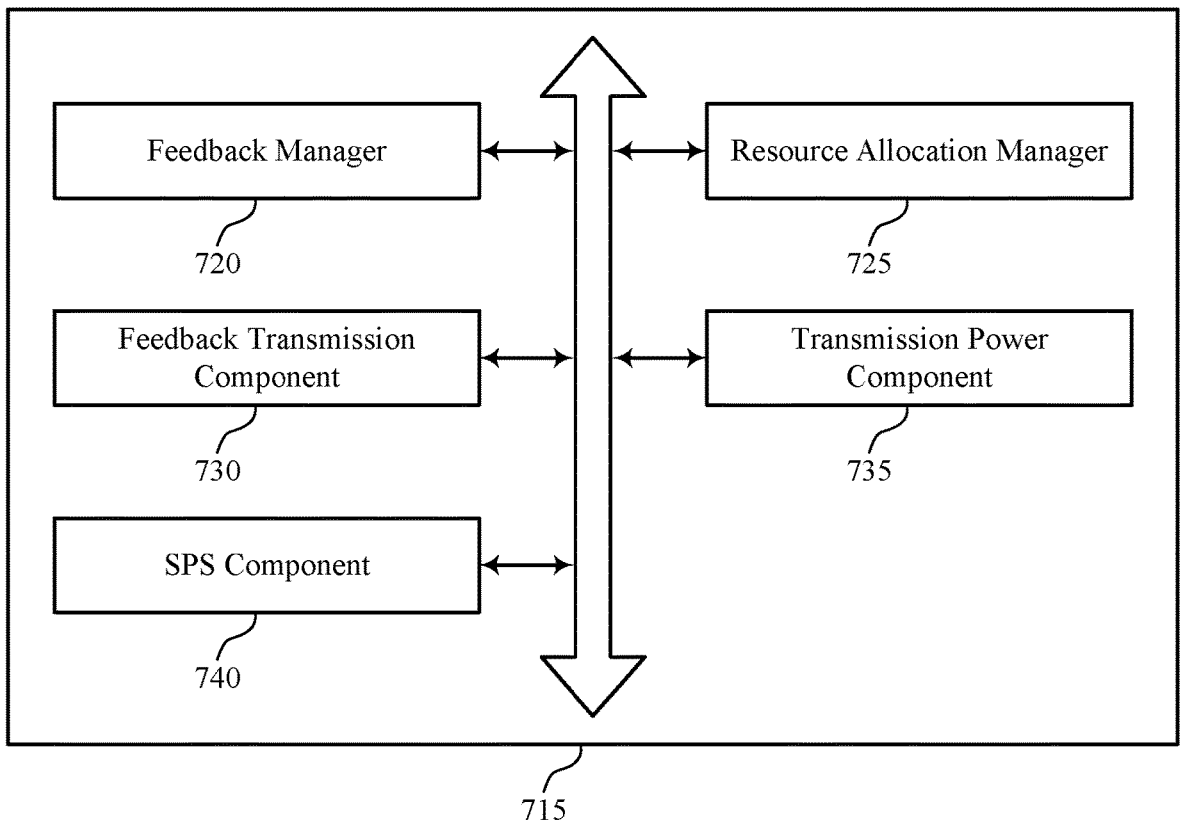

FIG. 7 shows a block diagram 700 of a UE communications manager 715 that supports feedback transmission techniques in coordinated clusters of transmission reception points in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include feedback manager 720, resource allocation manager 725, feedback transmission component 730, transmission power component 735, and SPS component 740. Each of these modules may communicate, directly or indirectly, with one another (e.g., via one or more buses).

Feedback manager 720 may determine that a downlink transmission from a first TRP of a group of TRPs in a coordinated cluster is unsuccessfully received.

Resource allocation manager 725 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. In some cases, resource allocation manager 725 may identify a third set of uplink resources for uplink transmissions to the first TRP, the third set of uplink resources for transmitting ACK feedback to indicate successful receipt of the downlink transmission from the first TRP. In some cases, resource allocation manager 725 may identify a second subset of the set of NOMA uplink resources for transmitting the NACK feedback to a third TRP of the coordinated cluster. In some cases, the NOMA uplink resources are common resources shared by a set of UEs that may concurrently transmit NACK feedback using the common resources. In some cases, the identifying further includes identifying a second set of dedicated resources for uplink transmissions to the second TRP, the second set of dedicated resources allocated to the first UE for transmitting critical NACK feedback to the second TRP. In some cases, the identifying the set of NOMA uplink resources includes identifying a single uplink resource for transmitting the NACK feedback to at least the second TRP and a third TRP of the coordinated cluster. In some cases, the identifying the set of NOMA uplink resources includes identifying a first subset of the set of NOMA uplink resources for transmitting the NACK feedback to the second TRP.

Feedback transmission component 730 may transmit, based on the identifying, the NACK feedback to at least the second TRP using the set of NOMA uplink resources.

Transmission power component 735 may determine a transmission power for transmitting the NACK feedback. In some cases, transmission power component 735 may determine a transmission power for transmitting the NACK feedback using the first subset and the second subset of the set of NOMA uplink resources, divide the transmission power between the first subset and the second subset of the set of NOMA uplink resources when the first subset and the second subset of the set of NOMA uplink resources are located within a same OFDM symbol, and transmit, using the determined transmission power, the NACK feedback using each of the first subset and the second subset of the set of NOMA uplink resources when the first subset and the second subset of the set of NOMA uplink resources are located within a different OFDM symbols.

SPS component 740 may receive a semi-persistent scheduling (SPS) configuration from the first TRP that indicates downlink resources of the downlink transmission. In some cases, the SPS configuration from the first TRP further includes an indication of the set of NOMA resources of at least the second TRP for transmitting the NACK feedback.

Figure 8:
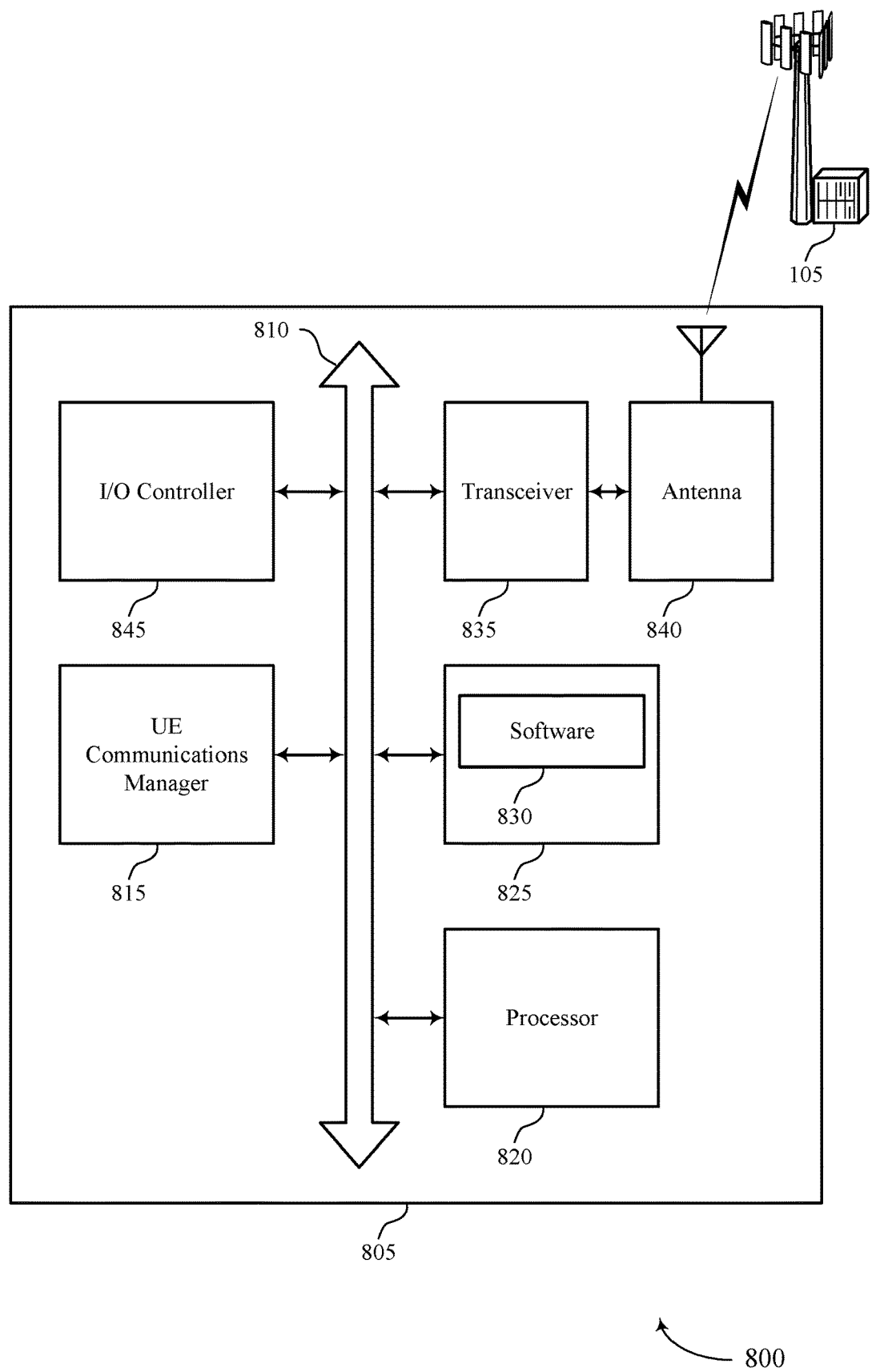
FIG. 8 illustrates a block diagram of a system including a UE that supports feedback transmission techniques in coordinated clusters of transmission reception points in accordance with aspects of the present disclosure.

FIG. 8 shows a diagram of a system 800 including a device 805 that supports feedback transmission techniques in coordinated clusters of transmission reception points in accordance with aspects of the present disclosure. Device 805 may be an example of or include the components of wireless device 505, wireless device 605, or a UE 115 as described herein, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting feedback transmission techniques in coordinated clusters of transmission reception points).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support feedback transmission techniques in coordinated clusters of transmission reception points. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
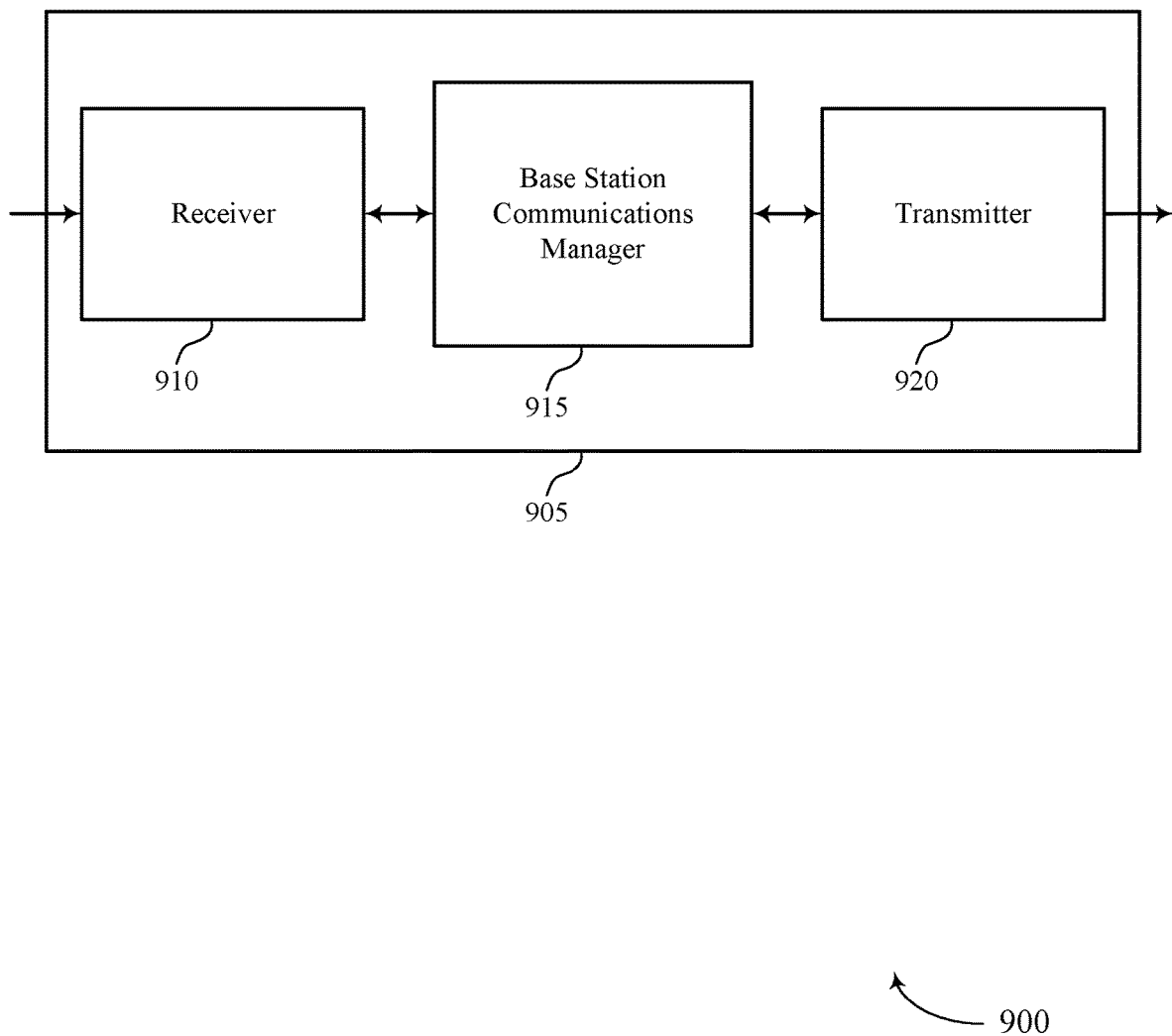
FIGS. 9 through 11 show block diagrams of a device that supports feedback transmission techniques in coordinated clusters of transmission reception points in accordance with aspects of the present disclosure.

FIG. 9 shows a block diagram 900 of a wireless device 905 that supports feedback transmission techniques in coordinated clusters of transmission reception points in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to feedback transmission techniques in coordinated clusters of transmission reception points, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may configure, at a first TRP of a group of TRPs in a coordinated cluster, a first set of uplink resources for feedback transmissions from at least a first of UE associated with the first TRP, and a second set of NOMA uplink resources for feedback transmissions from at least a second UE that is associated with a different TRP of the group of TRPs, transmit an indication of the first set of uplink resources and the second set of uplink resources to the one or more different TRPs of the group of TRPs, and receive, via the second set of NOMA uplink resources, a NACK feedback transmission from at least the second UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
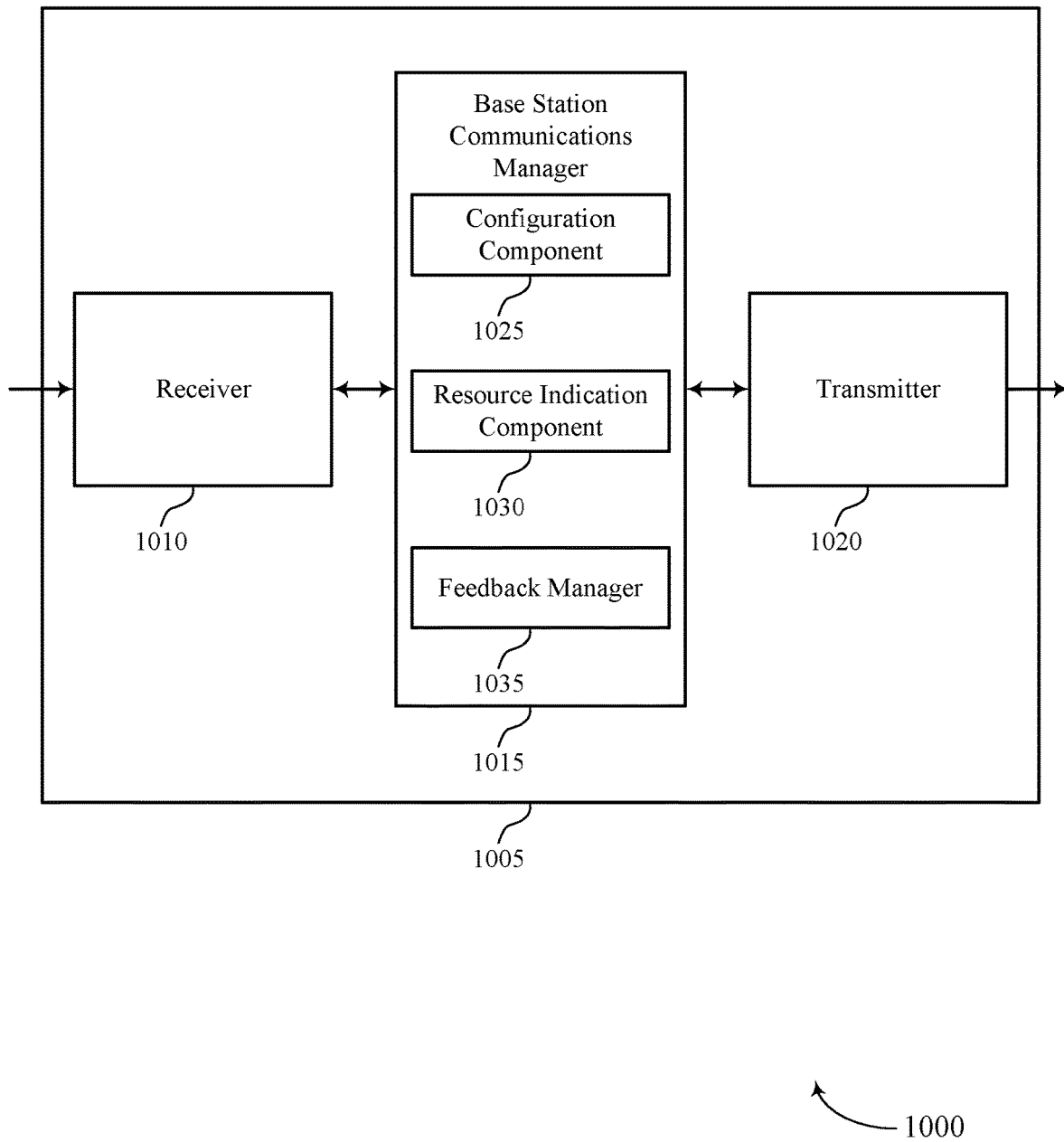

FIG. 10 shows a block diagram 1000 of a wireless device 1005 that supports feedback transmission techniques in coordinated clusters of transmission reception points in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to feedback transmission techniques in coordinated clusters of transmission reception points, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include configuration component 1025, resource indication component 1030, and feedback manager 1035.

Configuration component 1025 may configure, at a first TRP of a group of TRPs in a coordinated cluster, a first set of uplink resources for feedback transmissions from at least a first of UE associated with the first TRP, and a second set of NOMA uplink resources for feedback transmissions from at least a second UE associated with a different TRP of the group of TRPs. In some cases, the first set of uplink resources are configured for uplink transmissions of ACK feedback to indicate successful receipt of a first downlink transmission from the first TRP at the first UE, and the second set of NOMA uplink resources are configured for uplink transmissions of NACK feedback from two or more other UEs that are associated with the one or more different TRPs of the group of TRPs. In some cases, the second set of NOMA uplink resources include common resources for concurrent feedback transmissions from two or more other UEs that are associated with one or more different TRPs of the group of TRPs.

Resource indication component 1030 may transmit an indication of the first set of uplink resources and the second set of uplink resources to the one or more different TRPs of the group of TRPs and transmit an indication of the second set of NOMA uplink resources, the third set of uplink resources, and one or more NOMA parameters, to the one or more different TRPs of the group of TRPs.

Feedback manager 1035 may determine that a third UE associated with a different TRP of the group of TRPs is a high priority UE, configure a third set of uplink resources that are dedicated to the third UE for uplink transmissions of NACK feedback from the third UE. In some cases, feedback manager 1035 may receive, via the second set of NOMA uplink resources, a NACK feedback transmission from at least the second UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
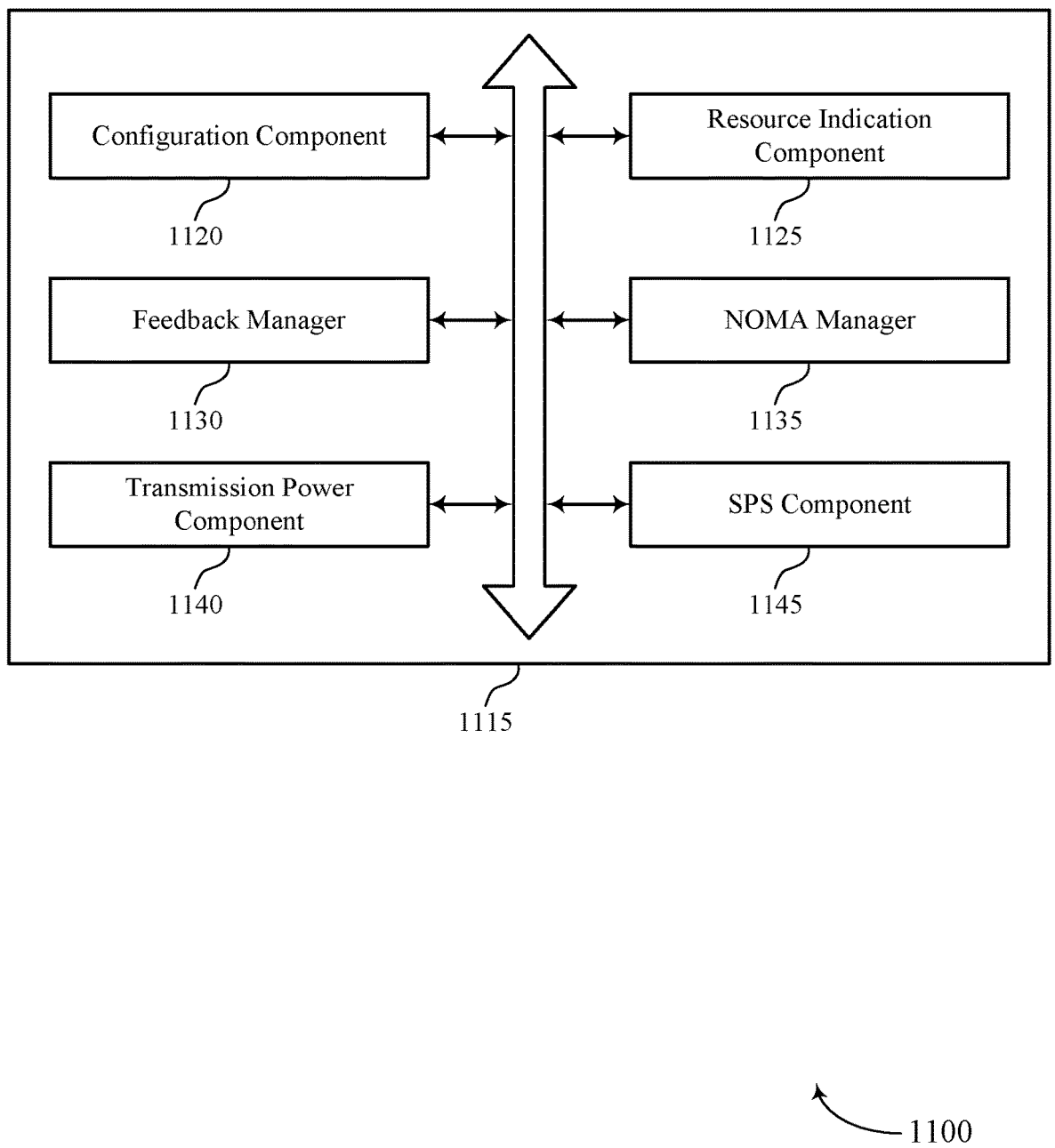

FIG. 11 shows a block diagram 1100 of a base station communications manager 1115 that supports feedback transmission techniques in coordinated clusters of transmission reception points in accordance with aspects of the present disclosure. The base station communications manager 1115 may be an example of aspects of a base station communications manager 1215 described with reference to FIGS. 9, 10, and 12. The base station communications manager 1115 may include configuration component 1120, resource indication component 1125, feedback manager 1130, NOMA manager 1135, transmission power component 1140, and SPS component 1145. Each of these modules may communicate, directly or indirectly, with one another (e.g., via one or more buses).

Configuration component 1120 may configure, at a first TRP of a group of TRPs in a coordinated cluster, a first set of uplink resources for feedback transmissions from at least a first of UE associated with the first TRP, and a second set of NOMA uplink resources for feedback transmissions from at least a second UE associated with a different TRP of the group of TRPs. In some cases, the first set of uplink resources are configured for uplink transmissions of ACK feedback to indicate successful receipt of a first downlink transmission from the first TRP at the first UE, and the second set of NOMA uplink resources are configured for uplink transmissions of NACK feedback from two or more other UEs that are associated with the one or more different TRPs of the group of TRPs. In some cases, the second set of NOMA uplink resources include common resources for concurrent feedback transmissions from two or more other UEs that are associated with one or more different TRPs of the group of TRPs.

Resource indication component 1125 may transmit an indication of the first set of uplink resources and the second set of uplink resources to the one or more different TRPs of the group of TRPs and transmit an indication of the second set of NOMA uplink resources, the third set of uplink resources, and one or more NOMA parameters, to the one or more different TRPs of the group of TRPs.

Feedback manager 1130 may determine that a third UE that is associated with a different TRP of the group of TRPs is a high priority UE, configure a third set of uplink resources dedicated to the third UE for uplink transmissions of NACK feedback from the third UE, and receive, via the second set of NOMA uplink resources, a NACK feedback transmission from at least the second UE.

NOMA manager 1135 may coordinate with the one or more different TRPs to identify a first subset of the second set of NOMA uplink resources for transmitting the feedback to the first TRP and a second subset of the second set of NOMA uplink resources for transmitting the feedback to a second TRP of the one or more different TRPs.

Transmission power component 1140 may configure a UE to divide an uplink transmission power between the first subset and the second subset of the second set of NOMA uplink resources when the first subset and the second subset of the second set of NOMA uplink resources are located within a same OFDM symbol. In some cases, the UE is configured to use a same uplink transmission power for uplink transmissions using the first subset and the second subset of the second set of NOMA uplink resources when the first subset and the second subset of the second set of NOMA uplink resources are located within different OFDM symbols.

SPS component 1145 may identify a semi-persistent scheduling (SPS) configuration for two or more other UEs that are associated with the one or more different TRPs of the group of TRPs, and the configuring of the second set of NOMA uplink resources is based on the SPS configuration.

Figure 12:
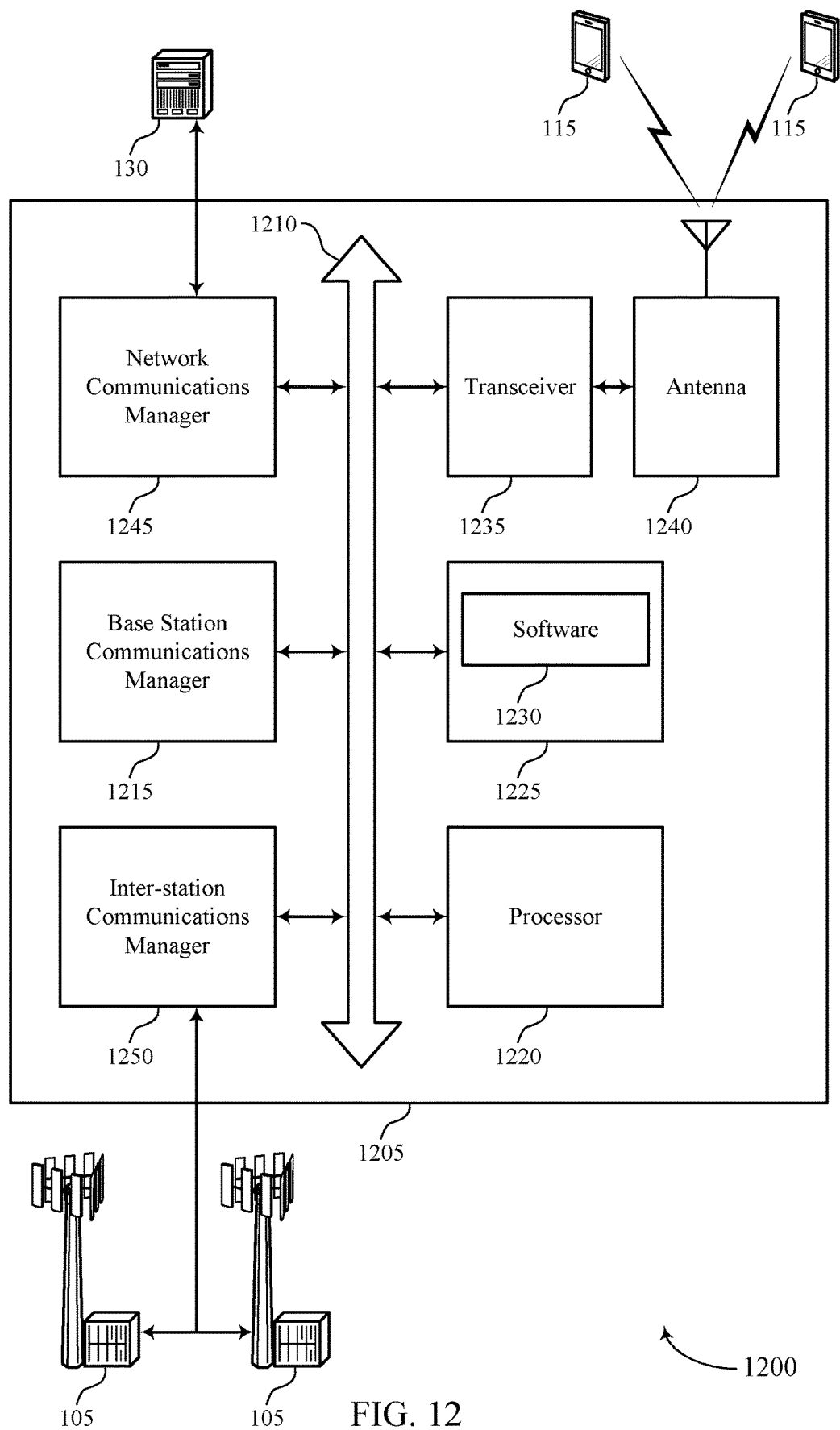
FIG. 12 illustrates a block diagram of a system including a base station that supports feedback transmission techniques in coordinated clusters of transmission reception points in accordance with aspects of the present disclosure.

FIG. 12 shows a diagram of a system 1200 including a device 1205 that supports feedback transmission techniques in coordinated clusters of transmission reception points in accordance with aspects of the present disclosure. Device 1205 may be an example of or may include the components of base station 105 as described herein, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting feedback transmission techniques in coordinated clusters of transmission reception points).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support feedback transmission techniques in coordinated clusters of transmission reception points. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
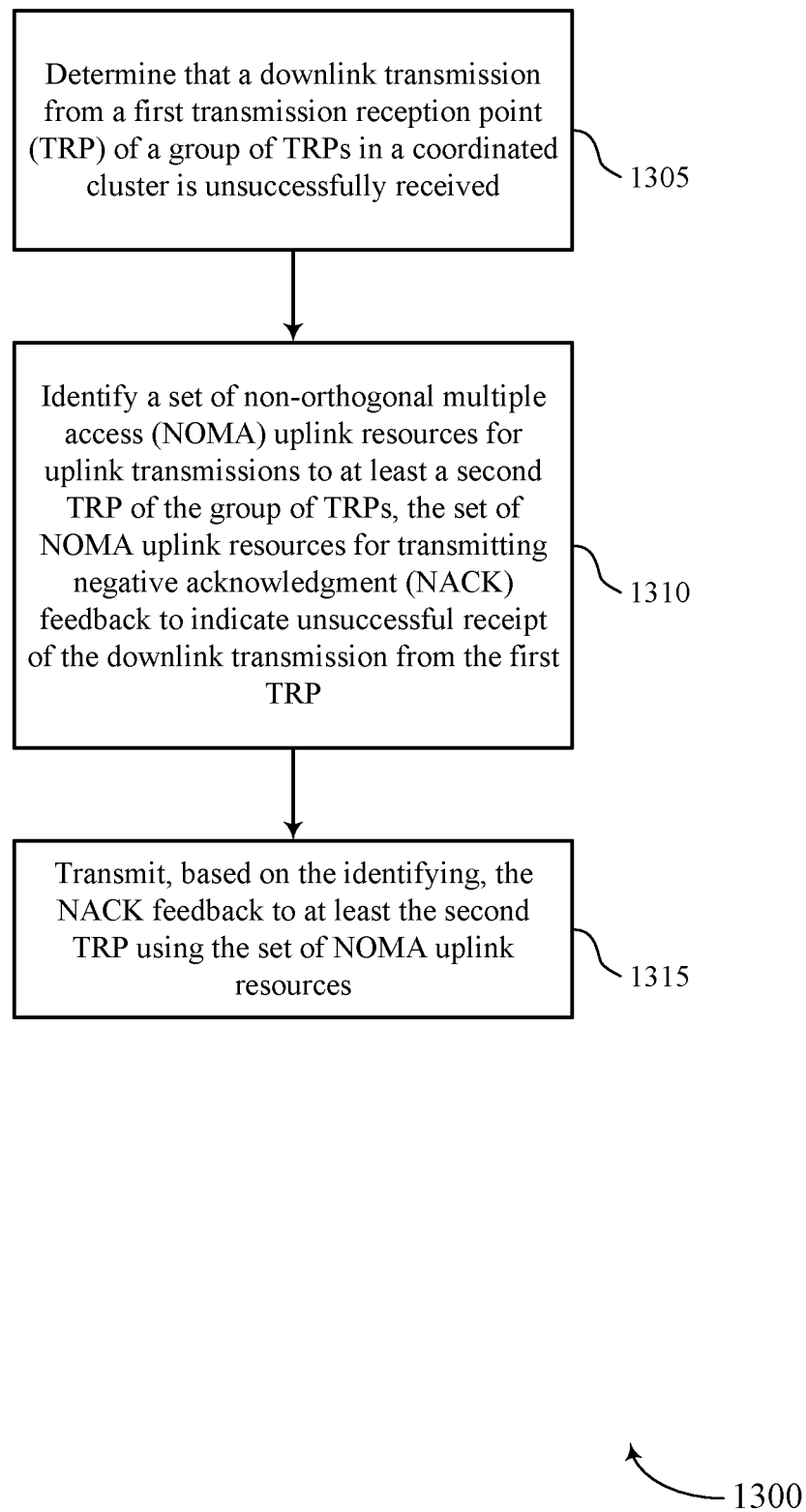
FIGS. 13 through 20 illustrate methods for feedback transmission techniques in coordinated clusters of transmission reception points in accordance with aspects of the present disclosure.

FIG. 13 shows a flowchart illustrating a method 1300 for feedback transmission techniques in coordinated clusters of transmission reception points in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1305 the UE 115 may determine that a downlink transmission from a first TRP of a group of TRPs in a coordinated cluster is unsuccessfully received. The operations of 1305 may be performed according to the methods described herein. In certain examples, aspects of the operations of 1305 may be performed by a feedback manager as described with reference to FIGS. 5 through 8.

At 1310 the UE 115 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. The operations of 1310 may be performed according to the methods described herein. In certain examples, aspects of the operations of 1310 may be performed by a resource allocation manager as described with reference to FIGS. 5 through 8.

At 1315 the UE 115 may transmit, based on the identifying, the NACK feedback to at least the second TRP using the set of NOMA uplink resources. The operations of 1315 may be performed according to the methods described herein. In certain examples, aspects of the operations of 1315 may be performed by a feedback transmission component as described with reference to FIGS. 5 through 8.

Figure 14:
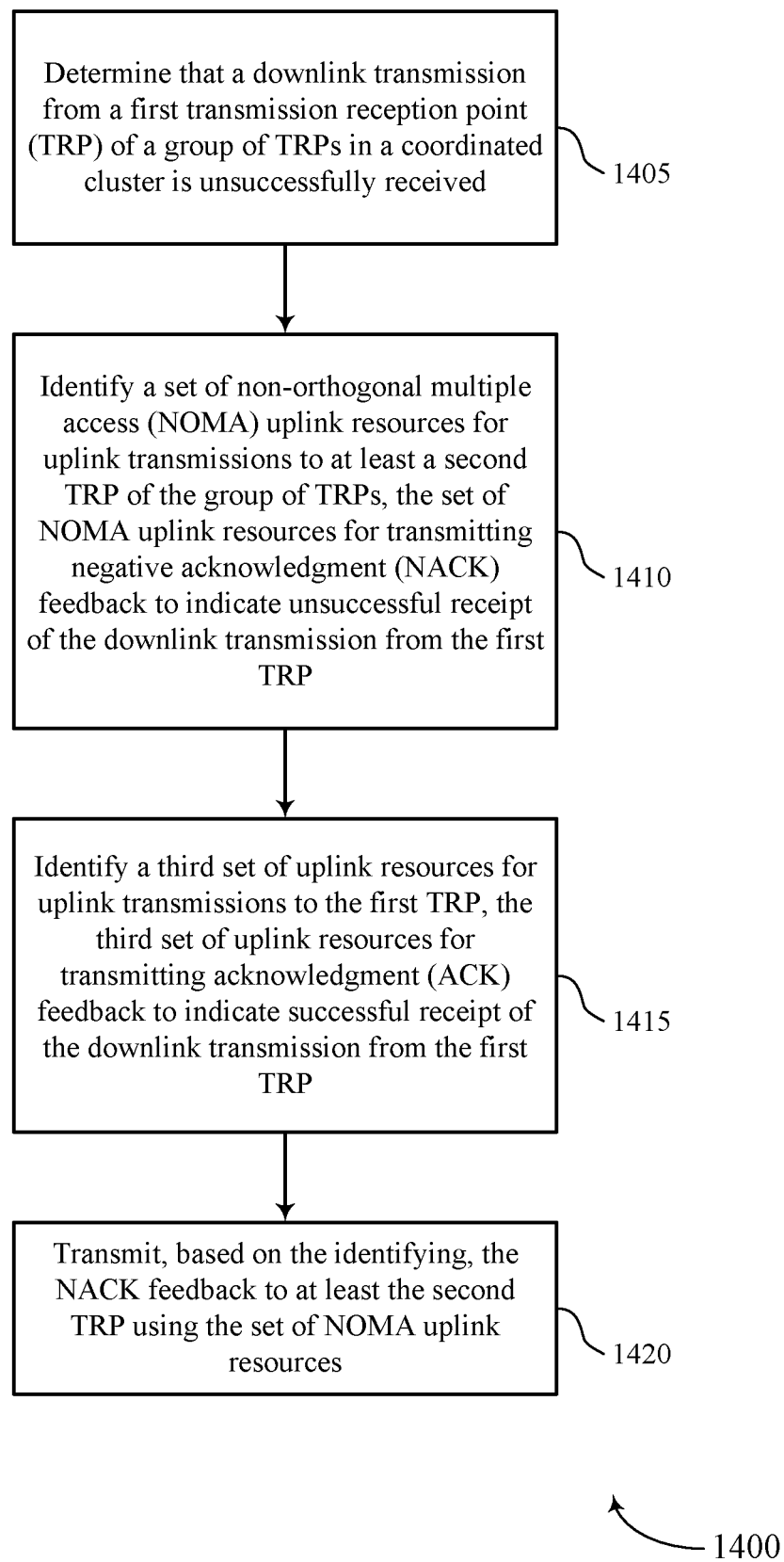

FIG. 14 shows a flowchart illustrating a method 1400 for feedback transmission techniques in coordinated clusters of transmission reception points in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may determine that a downlink transmission from a first TRP of a group of TRPs in a coordinated cluster is unsuccessfully received. The operations of 1405 may be performed according to the methods described herein. In certain examples, aspects of the operations of 1405 may be performed by a feedback manager as described with reference to FIGS. 5 through 8.

At 1410 the UE 115 may identify, at the first UE, a set of NOMA uplink resources for uplink transmissions to at least a second TRP of the group of TRPs, the set of NOMA uplink resources for transmitting NACK feedback to indicate unsuccessful receipt of the downlink transmission from the first TRP. The operations of 1410 may be performed according to the methods described herein. In certain examples, aspects of the operations of 1410 may be performed by a resource allocation manager as described with reference to FIGS. 5 through 8.

At 1415 the UE 115 may identify a third set of uplink resources for uplink transmissions to the first TRP, the third set of uplink resources for transmitting ACK feedback to indicate successful receipt of the downlink transmission from the first TRP. The operations of 1415 may be performed according to the methods described herein. In certain examples, aspects of the operations of 1415 may be performed by a resource allocation manager as described with reference to FIGS. 5 through 8. In some cases, the identifying involves identifying a second set of dedicated resources for uplink transmissions to the second TRP, the second set of dedicated resources being allocated to the first UE for transmitting critical NACK feedback to the second TRP.

At 1420 the UE 115 may transmit, based on the identifying, the NACK feedback to at least the second TRP using the set of NOMA uplink resources. The operations of 1420 may be performed according to the methods described herein. In certain examples, aspects of the operations of 1420 may be performed by a feedback transmission component as described with reference to FIGS. 5 through 8. In some cases, the NOMA uplink resources are common resources shared by a plurality of UEs that may concurrently transmit NACK feedback using the common resources.

Figure 15:
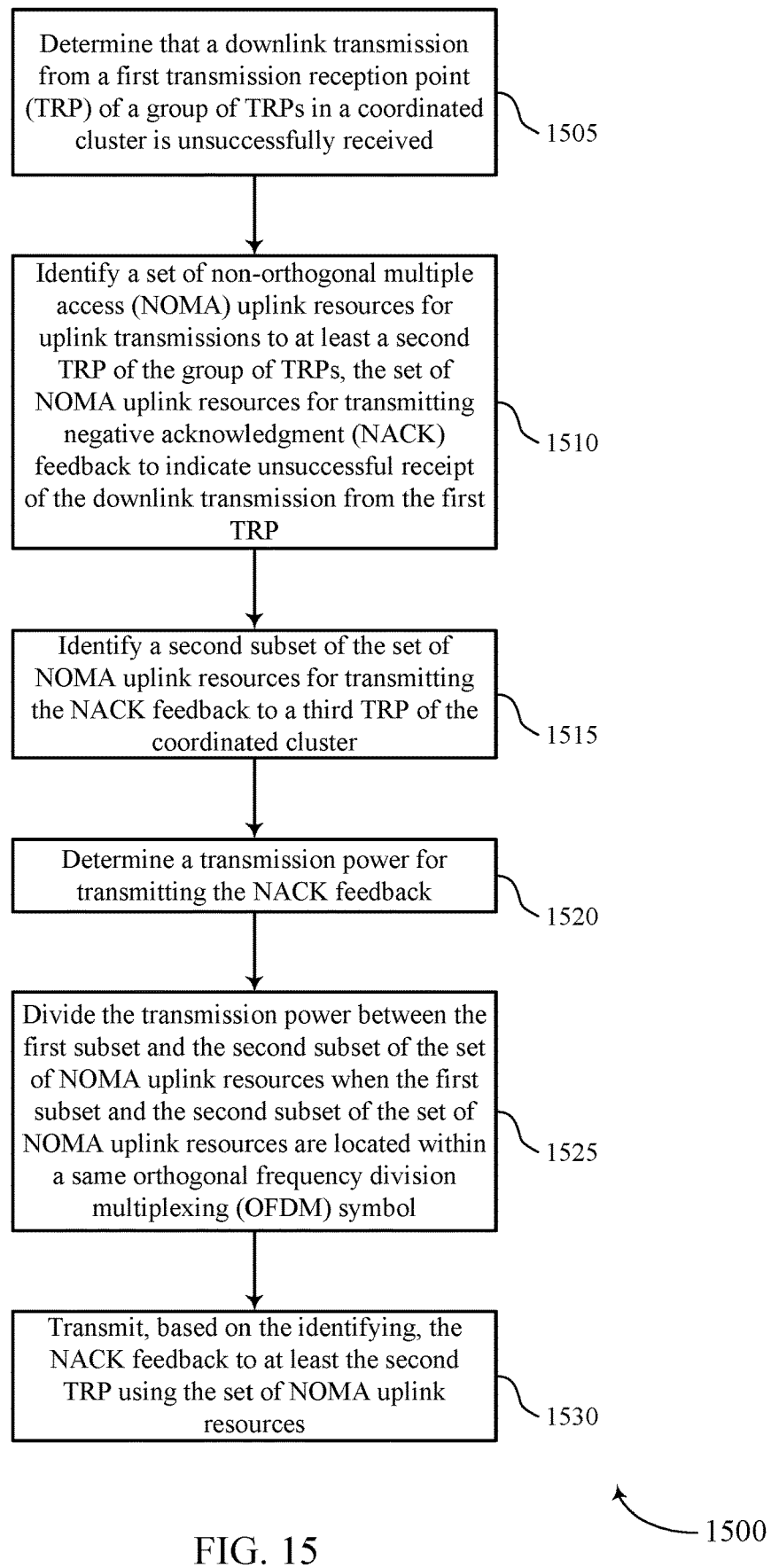

FIG. 15 shows a flowchart illustrating a method 1500 for feedback transmission techniques in coordinated clusters of transmission reception points in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may determine that a downlink transmission from a first TRP of a group of TRPs in a coordinated cluster is unsuccessfully received. The operations of 1505 may be performed according to the methods described herein. In certain examples, aspects of the operations of 1505 may be performed by a feedback manager as described with reference to FIGS. 5 through 8.

At 1510 the UE 115 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. The operations of 1510 may be performed according to the methods described herein. In certain examples, aspects of the operations of 1510 may be performed by a resource allocation manager as described with reference to FIGS. 5 through 8. In some cases, the identifying the set of NOMA uplink resources includes identifying a first subset of the set of NOMA uplink resources for transmitting the NACK feedback to the second TRP.

At 1515 the UE 115 may identify a second subset of the set of NOMA uplink resources for transmitting the NACK feedback to a third TRP of the coordinated cluster. The operations of 1515 may be performed according to the methods described herein. In certain examples, aspects of the operations of 1515 may be performed by a resource allocation manager as described with reference to FIGS. 5 through 8.

At 1520 the UE 115 may determine a transmission power for transmitting the NACK feedback. The operations of 1520 may be performed according to the methods described herein. In certain examples, aspects of the operations of 1520 may be performed by a transmission power component as described with reference to FIGS. 5 through 8.

At 1525 the UE 115 may divide the transmission power between the first subset and the second subset of the set of NOMA uplink resources where the first subset and the second subset of the set of NOMA uplink resources are located within a same OFDM symbol. The operations of 1525 may be performed according to the methods described herein. In certain examples, aspects of the operations of 1525 may be performed by a transmission power component as described with reference to FIGS. 5 through 8.

At 1530 the UE 115 may transmit, based on the identifying, the NACK feedback to at least the second TRP using the set of NOMA uplink resources. The operations of 1530 may be performed according to the methods described herein. In certain examples, aspects of the operations of 1530 may be performed by a feedback transmission component as described with reference to FIGS. 5 through 8.

Figure 16:
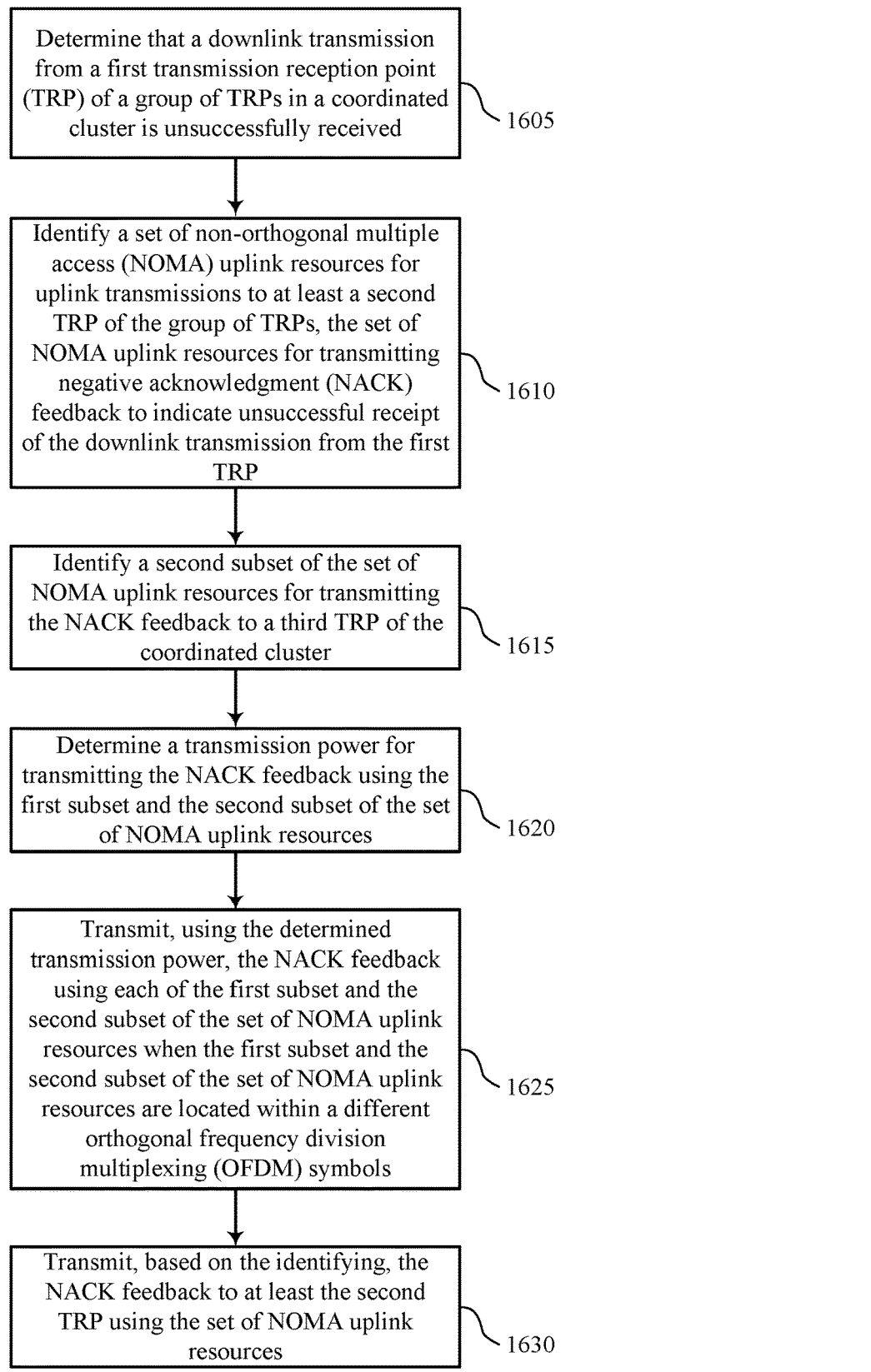

FIG. 16 shows a flowchart illustrating a method 1600 for feedback transmission techniques in coordinated clusters of transmission reception points in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may determine that a downlink transmission from a first TRP of a group of TRPs in a coordinated cluster is unsuccessfully received. The operations of 1605 may be performed according to the methods described herein. In certain examples, aspects of the operations of 1605 may be performed by a feedback manager as described with reference to FIGS. 5 through 8.

At 1610 the UE 115 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. The operations of 1610 may be performed according to the methods described herein. In certain examples, aspects of the operations of 1610 may be performed by a resource allocation manager as described with reference to FIGS. 5 through 8. In some cases, the identifying the set of NOMA uplink resources includes identifying a first subset of the set of NOMA uplink resources for transmitting the NACK feedback to the second TRP.

At 1615 the UE 115 may identify a second subset of the set of NOMA uplink resources for transmitting the NACK feedback to a third TRP of the coordinated cluster. The operations of 1615 may be performed according to the methods described herein. In certain examples, aspects of the operations of 1615 may be performed by a resource allocation manager as described with reference to FIGS. 5 through 8.

At 1620 the UE 115 may determine a transmission power for transmitting the NACK feedback using the first subset and the second subset of the set of NOMA uplink resources. The operations of 1620 may be performed according to the methods described herein. In certain examples, aspects of the operations of 1620 may be performed by a transmission power component as described with reference to FIGS. 5 through 8.

At 1625 the UE 115 may transmit, using the determined transmission power, the NACK feedback using each of the first subset and the second subset of the set of NOMA uplink resources when the first subset and the second subset of the set of NOMA uplink resources are located within different OFDM symbols. The operations of 1625 may be performed according to the methods described herein. In certain examples, aspects of the operations of 1625 may be performed by a transmission power component as described with reference to FIGS. 5 through 8.

At 1630 the UE 115 may transmit, based on the identifying, the NACK feedback to at least the second TRP using the set of NOMA uplink resources. The operations of 1630 may be performed according to the methods described herein. In certain examples, aspects of the operations of 1630 may be performed by a feedback transmission component as described with reference to FIGS. 5 through 8.

Figure 17:
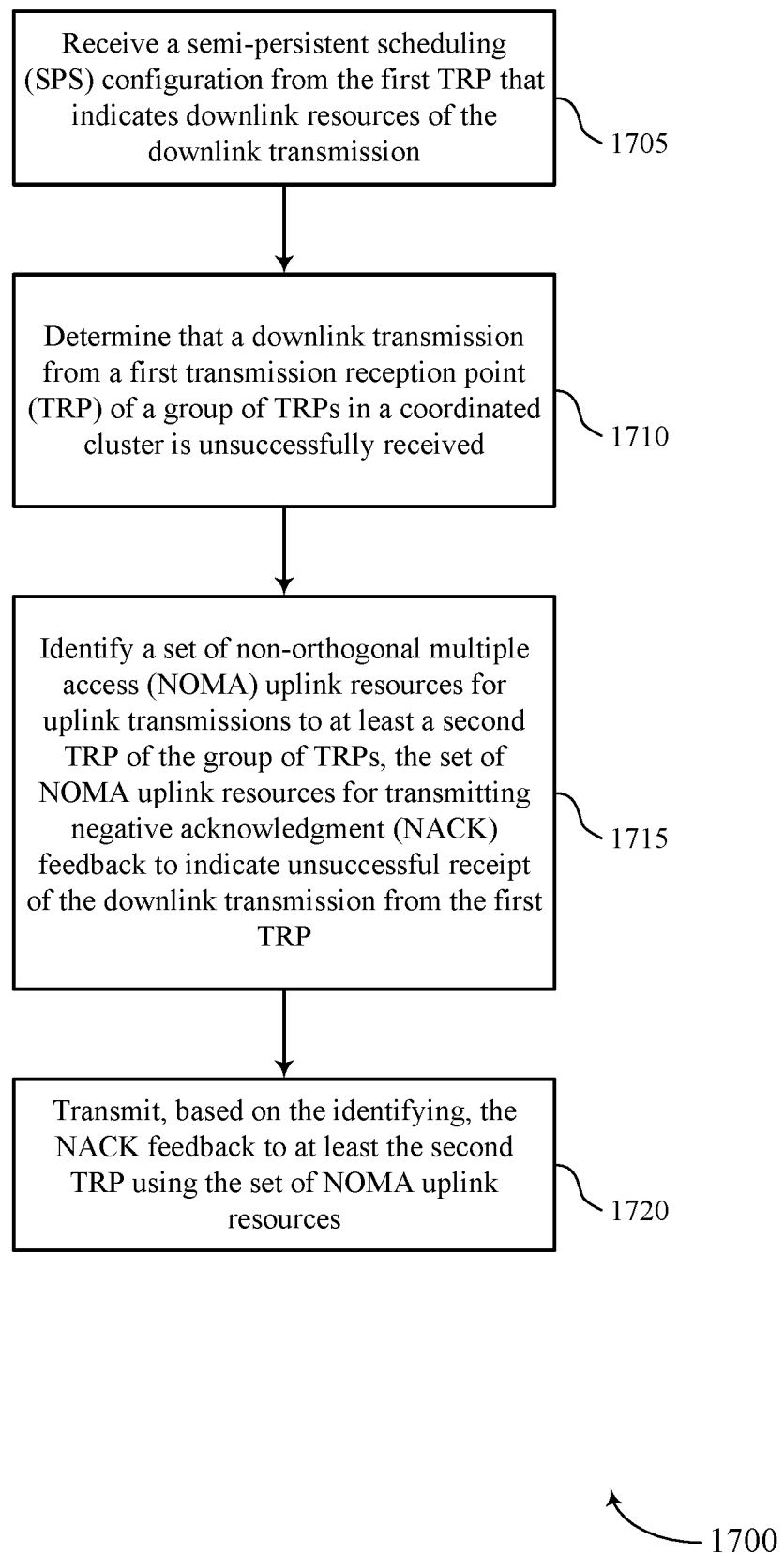

FIG. 17 shows a flowchart illustrating a method 1700 for feedback transmission techniques in coordinated clusters of transmission reception points in accordance with aspects of the present disclosure. The operations of method 1700 may be implemented by a UE 115 or its components as described herein. For example, the operations of method 1700 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive a semi-persistent scheduling (SPS) configuration from the first TRP that indicates downlink resources of a downlink transmission. The operations of 1705 may be performed according to the methods described herein. In certain examples, aspects of the operations of 1705 may be performed by an SPS component as described with reference to FIGS. 5 through 8.

At 1710 the UE 115 may determine that a downlink transmission from a first TRP of a group of TRPs in a coordinated cluster is unsuccessfully received. The operations of 1710 may be performed according to the methods described herein. In certain examples, aspects of the operations of 1710 may be performed by a feedback manager as described with reference to FIGS. 5 through 8.

At 1715 the UE 115 may identify a set of NOMA uplink resources for uplink transmissions to at least a second TRP of the group of TRPs, the set of NOMA uplink resources for transmitting NACK feedback to indicate unsuccessful receipt of the downlink transmission from the first TRP. The operations of 1715 may be performed according to the methods described herein. In certain examples, aspects of the operations of 1715 may be performed by a resource allocation manager as described with reference to FIGS. 5 through 8.

At 1720 the UE 115 may transmit, based on the identifying, the NACK feedback to at least the second TRP using the set of NOMA uplink resources. The operations of 1720 may be performed according to the methods described herein. In certain examples, aspects of the operations of 1720 may be performed by a feedback transmission component as described with reference to FIGS. 5 through 8.

Figure 18:
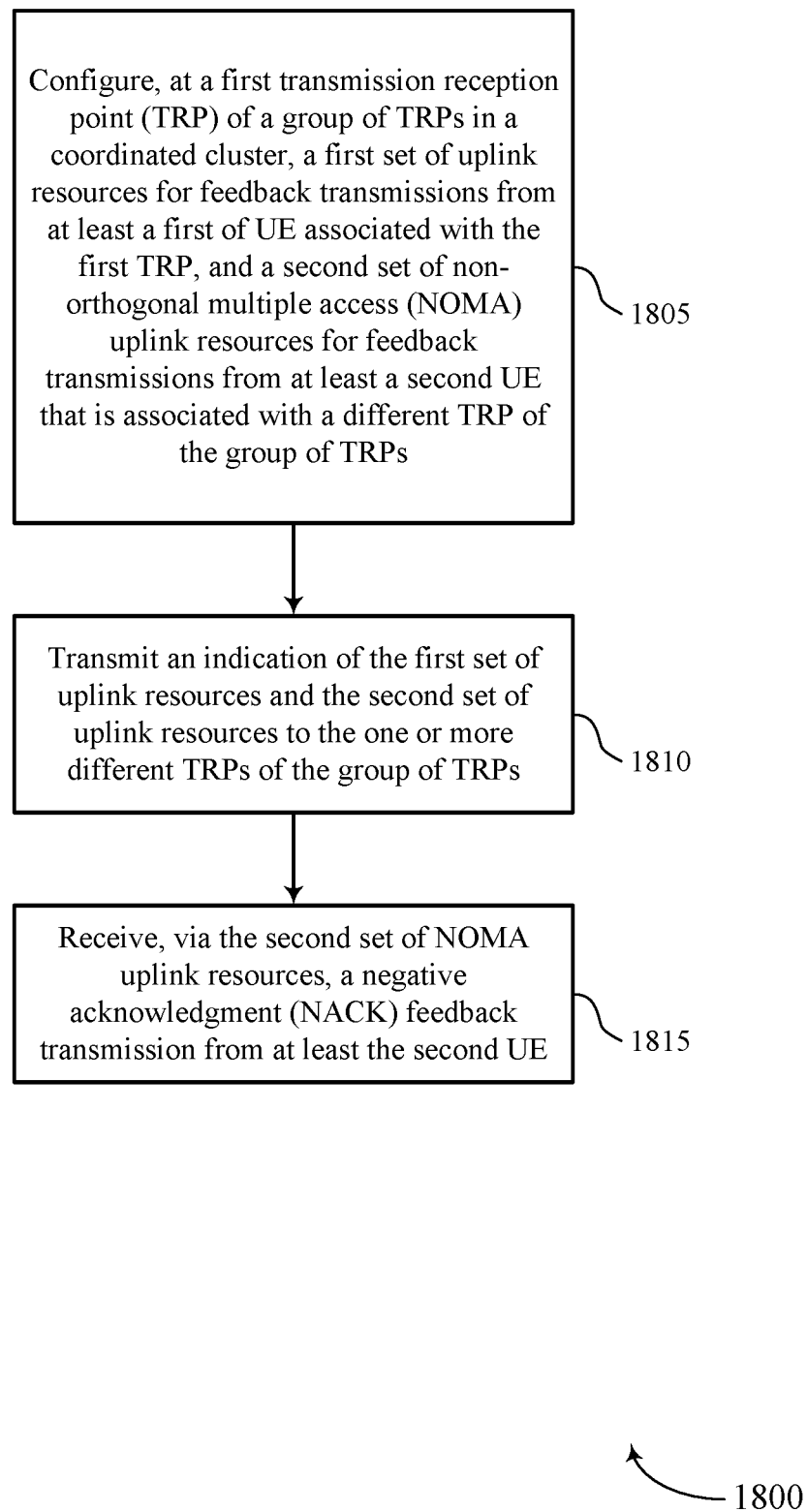

FIG. 18 shows a flowchart illustrating a method 1800 for feedback transmission techniques in coordinated clusters of transmission reception points in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may configure, at a first TRP of a group of TRPs in a coordinated cluster, a first set of uplink resources for feedback transmissions from at least a first UE associated with the first TRP, and a second set of NOMA uplink resources for feedback transmissions from at least a second UE associated with a different TRP of the group of TRPs. The operations of 1805 may be performed according to the methods described herein. In certain examples, aspects of the operations of 1805 may be performed by a configuration component as described with reference to FIGS. 9 through 12.

At 1810 the base station 105 may transmit an indication of the first set of uplink resources and the second set of uplink resources to one or more different TRPs of the group of TRPs. The operations of 1810 may be performed according to the methods described herein. In certain examples, aspects of the operations of 1810 may be performed by a resource indication component as described with reference to FIGS. 9 through 12.

At 1815 the base station 105 may receive, via the second set of NOMA uplink resources, a NACK feedback transmission from at least the second UE. The operations of 1815 may be performed according to the methods described herein. In certain examples, aspects of the operations of 1815 may be performed by a feedback manager as described with reference to FIGS. 9 through 12.

Figure 19:
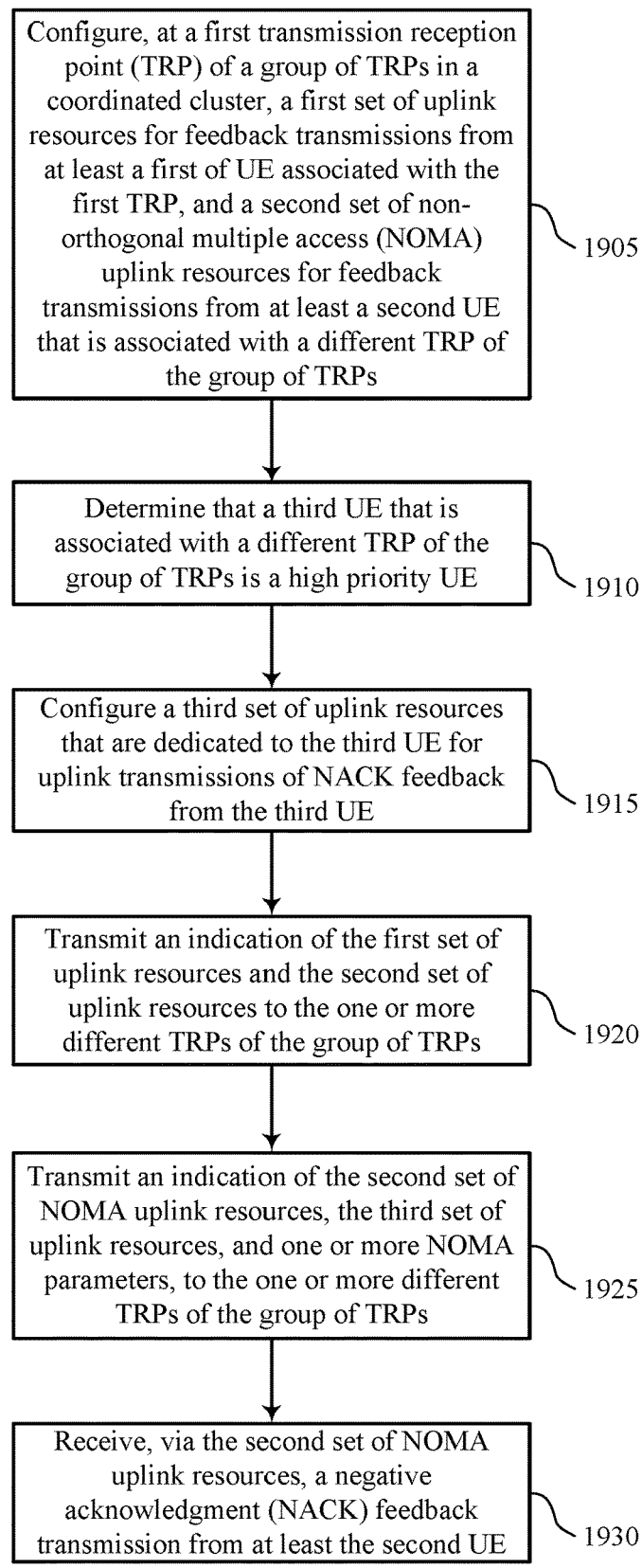

FIG. 19 shows a flowchart illustrating a method 1900 for feedback transmission techniques in coordinated clusters of transmission reception points in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1905 the base station 105 may configure, at a first TRP of a group of TRPs in a coordinated cluster, a first set of uplink resources for feedback transmissions from at least a first UE associated with the first TRP, and a second set of NOMA uplink resources for feedback transmissions from at least a second UE that is associated with a different TRP of the group of TRPs. The operations of 1905 may be performed according to the methods described herein. In certain examples, aspects of the operations of 1905 may be performed by a configuration component as described with reference to FIGS. 9 through 12. In some cases, the second set of NOMA uplink resources include common resources for concurrent feedback transmissions from two or more other UEs associated with one or more different TRPs of the group of TRPs.

At 1910 the base station 105 may determine that a third UE that is associated with a different TRP of the group of TRPs is a high priority UE. The operations of 1910 may be performed according to the methods described herein. In certain examples, aspects of the operations of 1910 may be performed by a feedback manager as described with reference to FIGS. 9 through 12.

At 1915 the base station 105 may configure a third set of uplink resources that are dedicated to the third UE for uplink transmissions of NACK feedback from the third UE. The operations of 1915 may be performed according to the methods described herein. In certain examples, aspects of the operations of 1915 may be performed by a feedback manager as described with reference to FIGS. 9 through 12.

At 1920 the base station 105 may transmit an indication of the first set of uplink resources and the second set of uplink resources to the one or more different TRPs of the group of TRPs. The operations of 1920 may be performed according to the methods described herein. In certain examples, aspects of the operations of 1920 may be performed by a resource indication component as described with reference to FIGS. 9 through 12.

At 1925 the base station 105 may transmit an indication of the second set of NOMA uplink resources, the third set of uplink resources, and one or more NOMA parameters, to the one or more different TRPs of the group of TRPs. The operations of 1925 may be performed according to the methods described herein. In certain examples, aspects of the operations of 1925 may be performed by a resource indication component as described with reference to FIGS. 9 through 12.

At 1930 the base station 105 may receive, via the second set of NOMA uplink resources, a NACK feedback transmission from at least the second UE. The operations of 1930 may be performed according to the methods described herein. In certain examples, aspects of the operations of 1930 may be performed by a feedback manager as described with reference to FIGS. 9 through 12.

Figure 20:
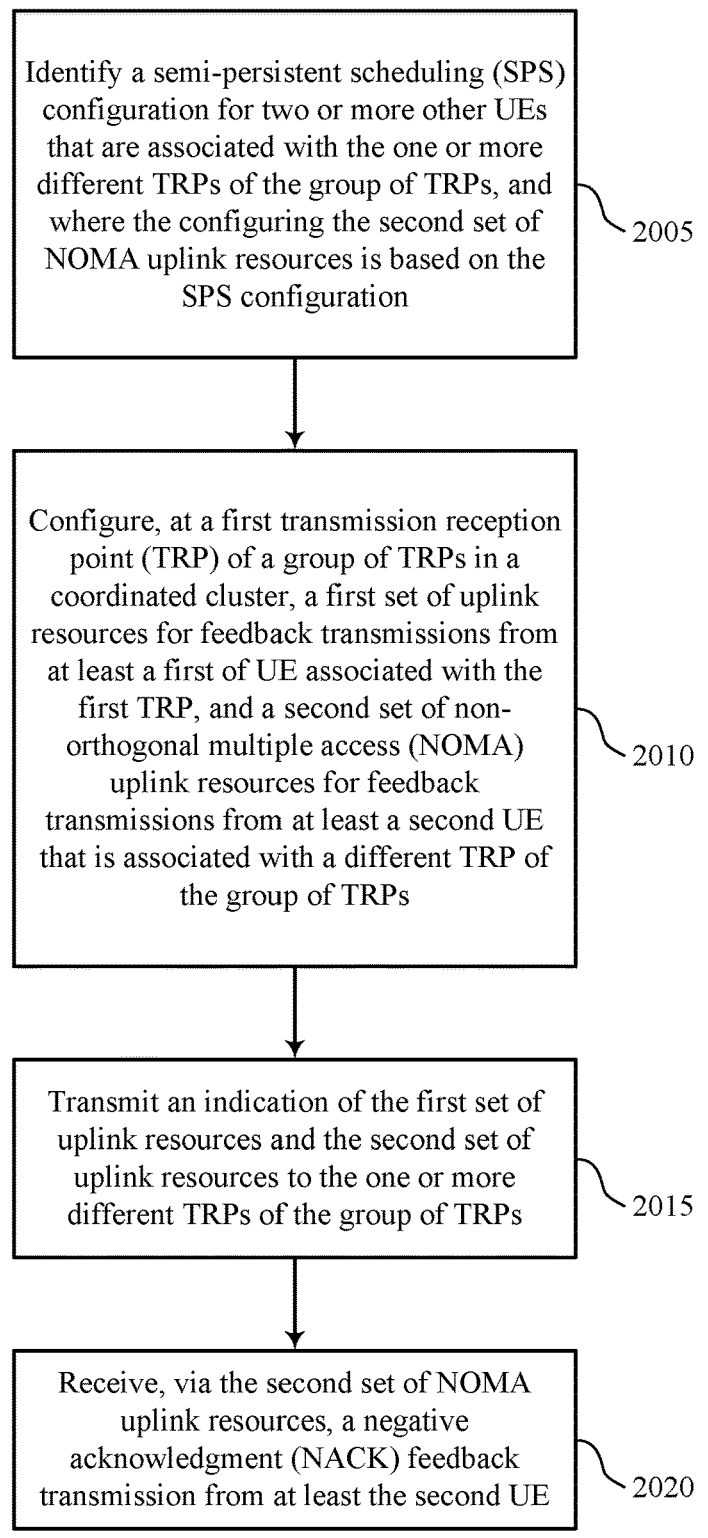

FIG. 20 shows a flowchart illustrating a method 2000 for feedback transmission techniques in coordinated clusters of transmission reception points in accordance with aspects of the present disclosure. The operations of method 2000 may be implemented by a base station 105 or its components as described herein. For example, the operations of method 2000 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 2005 the base station 105 may be a first TRP of a group of TRPs in a coordinated cluster, and may identify an SPS configuration for two or more UEs that are associated with the one or more different TRPs of the group of TRPs, and where the configuring the second set of NOMA uplink resources is based on the SPS configuration. The operations of 2005 may be performed according to the methods described herein. In certain examples, aspects of the operations of 2005 may be performed by an SPS component as described with reference to FIGS. 9 through 12.

At 2010 the base station 105 may configure a first set of uplink resources for feedback transmissions from at least a first of UE associated with the first TRP, and a second set of NOMA uplink resources for feedback transmissions from at least a second UE that is associated with a different TRP of the group of TRPs. The operations of 2010 may be performed according to the methods described herein. In certain examples, aspects of the operations of 2010 may be performed by a configuration component as described with reference to FIGS. 9 through 12.

At 2015 the base station 105 may transmit an indication of the first set of uplink resources and the second set of uplink resources to the one or more different TRPs of the group of TRPs. The operations of 2015 may be performed according to the methods described herein. In certain examples, aspects of the operations of 2015 may be performed by a resource indication component as described with reference to FIGS. 9 through 12.

At 2020 the base station 105 may receive, via the second set of NOMA uplink resources, a NACK feedback transmission from at least the second UE. The operations of 2020 may be performed according to the methods described herein. In certain examples, aspects of the operations of 2020 may be performed by a feedback manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining, at a first user equipment (UE), that a downlink transmission from a first transmission reception point (TRP) of a group of TRPs in a coordinated cluster is unsuccessfully received;
    identifying, at the first UE, a set of non-orthogonal multiple access (NOMA) uplink resources for uplink transmissions to at least a second TRP of the group of TRPs, the set of NOMA uplink resources for transmitting negative acknowledgment (NACK) feedback to indicate unsuccessful receipt of the downlink transmission from the first TRP; and
    transmitting, based at least in part on the identifying, the NACK feedback to at least the second TRP using the set of NOMA uplink resources.

2. The method of claim 1, further comprising:
    receiving a semi-persistent scheduling (SPS) configuration from the first TRP that indicates downlink resources of the downlink transmission.

3. The method of claim 2, wherein the SPS configuration from the first TRP further comprises an indication of the set of NOMA resources of at least the second TRP for transmitting the NACK feedback.

4. The method of claim 1, wherein the NOMA uplink resources are common resources that are shared by a plurality of UEs that may concurrently transmit NACK feedback using the common resources.

5. The method of claim 4, wherein the identifying further comprises identifying a second set of dedicated resources for uplink transmissions to the second TRP, the second set of dedicated resources being allocated to the first UE for transmitting critical NACK feedback to the second TRP.

6. The method of claim 1, further comprising:
    identifying, at the first UE, a third set of uplink resources for uplink transmissions to the first TRP, the third set of uplink resources for transmitting acknowledgment (ACK) feedback to indicate successful receipt of the downlink transmission from the first TRP.

7. The method of claim 1, wherein the identifying the set of NOMA uplink resources comprises identifying a single uplink resource for transmitting the NACK feedback to at least the second TRP and a third TRP of the coordinated cluster.

8. The method of claim 1, wherein:
    the identifying the set of NOMA uplink resources comprises identifying a first subset of the set of NOMA uplink resources for transmitting the NACK feedback to the second TRP; and
    identifying a second subset of the set of NOMA uplink resources for transmitting the NACK feedback to a third TRP of the coordinated cluster.

9. The method of claim 8, further comprising:
    determining a transmission power for transmitting the NACK feedback; and
    dividing the transmission power between the first subset and the second subset of the set of NOMA uplink resources when the first subset and the second subset of the set of NOMA uplink resources are located within a same orthogonal frequency division multiplexing (OFDM) symbol.

10. The method of claim 8, further comprising:
    determining a transmission power for transmitting the NACK feedback using the first subset and the second subset of the set of NOMA uplink resources; and
    transmitting, using the determined transmission power, the NACK feedback using each of the first subset and the second subset of the set of NOMA uplink resources when the first subset and the second subset of the set of NOMA uplink resources are located within a different orthogonal frequency division multiplexing (OFDM) symbols.

11. An apparatus for wireless communication, comprising:
    a processor;
    memory in electronic communication with the processor; and
    instructions stored in the memory and executable by the processor to cause the apparatus to:
        determine, at a first user equipment (UE), that a downlink transmission from a first transmission reception point (TRP) of a group of TRPs in a coordinated cluster is unsuccessfully received;

identify, at the first UE, a set of non-orthogonal multiple access (NOMA) uplink resources for uplink transmissions to at least a second TRP of the group of TRPs, the set of NOMA uplink resources for transmitting negative acknowledgment (NACK) feedback to indicate unsuccessful receipt of the downlink transmission from the first TRP; and transmit, based at least in part on the identifying, the NACK feedback to at least the second TRP using the set of NOMA uplink resources.

12. The apparatus of claim 11, wherein the instructions are further executable by the processor to cause the apparatus to:
receive a semi-persistent scheduling (SPS) configuration from the first TRP that indicates downlink resources of the downlink transmission.

13. The apparatus of claim 12, wherein the SPS configuration from the first TRP further comprises an indication of the set of NOMA resources of at least the second TRP for transmitting the NACK feedback.

14. The apparatus of claim 11, wherein the NOMA uplink resources are common resources that are shared by a plurality of UEs that may concurrently transmit NACK feedback using the common resources.

15. The apparatus of claim 14, wherein the identifying further comprises identifying a second set of dedicated resources for uplink transmissions to the second TRP, the second set of dedicated resources being allocated to the first UE for transmitting critical NACK feedback to the second TRP.

16. The apparatus of claim 11, wherein the instructions are further executable by the processor to cause the apparatus to:

identify, at the first UE, a third set of uplink resources for uplink transmissions to the first TRP, the third set of uplink resources for transmitting acknowledgment (ACK) feedback to indicate successful receipt of the downlink transmission from the first TRP.

17. The apparatus of claim 11, wherein the identifying the set of NOMA uplink resources comprises identifying a single uplink resource for transmitting the NACK feedback to at least the second TRP and a third TRP of the coordinated cluster.

18. The apparatus of claim 11, wherein:
the identifying the set of NOMA uplink resources comprises identifying a first subset of the set of NOMA uplink resources for transmitting the NACK feedback to the second TRP; and
identify a second subset of the set of NOMA uplink resources for transmitting the NACK feedback to a third TRP of the coordinated cluster.

19. The apparatus of claim 18, wherein the instructions are further executable by the processor to cause the apparatus to:
determine a transmission power for transmitting the NACK feedback; and
divide the transmission power between the first subset and the second subset of the set of NOMA uplink resources when the first subset and the second subset of the set of NOMA uplink resources are located within a same orthogonal frequency division multiplexing (OFDM) symbol.

* * * * *